(12) United States Patent
Melanson et al.

(10) Patent No.: US 8,344,707 B2
(45) Date of Patent: Jan. 1, 2013

(54) CURRENT SENSING IN A SWITCHING POWER CONVERTER

(75) Inventors: John L. Melanson, Austin, TX (US); Mauro Gaetano, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 988 days.

(21) Appl. No.: 12/242,001

(22) Filed: Sep. 30, 2008

(65) Prior Publication Data

US 2010/0079125 A1 Apr. 1, 2010

Related U.S. Application Data

(60) Provisional application No. 61/083,717, filed on Jul. 25, 2008.

(51) Int. Cl.
*G05F 1/00* (2006.01)

(52) U.S. Cl. .......................... 323/222; 323/282

(58) Field of Classification Search .................. 283/222, 283/282–285; 323/222, 282–285
See application file for complete search history.

(56) References Cited

U.S. PATENT DOCUMENTS

| | | |
|---|---|---|
| 3,316,495 A | 4/1967 | Sherer |
| 3,423,689 A | 1/1969 | Miller et al. |
| 3,586,988 A | 6/1971 | Weekes |
| 3,725,804 A | 4/1973 | Langan |
| 3,790,878 A | 2/1974 | Brokaw |
| 3,881,167 A | 4/1975 | Pelton et al. |
| 4,075,701 A | 2/1978 | Hofmann |
| 4,334,250 A | 6/1982 | Theus |
| 4,409,476 A | 10/1983 | Lofgren et al. |
| 4,414,493 A | 11/1983 | Henrich |
| 4,476,706 A | 10/1984 | Hadden et al. |
| 4,523,128 A | 6/1985 | Stamm |
| 4,677,366 A | 6/1987 | Wilkinson et al. |
| 4,683,529 A | 7/1987 | Bucher |
| 4,700,188 A | 10/1987 | James |

(Continued)

FOREIGN PATENT DOCUMENTS

DE 19713814 10/1998

(Continued)

OTHER PUBLICATIONS

ST Datasheet L6562, Transition-Mode PFC Controller, 2005, STMicroelectronics, Geneva, Switzerland.

(Continued)

*Primary Examiner* — Adolf Berhane
*Assistant Examiner* — Emily Pham
(74) *Attorney, Agent, or Firm* — Hamilton & Terrile, LLP; Kent B. Chambers

(57) ABSTRACT

A power control system includes a current sense resistor located on an output side of a switching power converter. By locating the current sense resistor on the output side of the switching power converter, the current sense resistor conducts a sense current when a control switch of the switching power converter is nonconductive. Since a duty cycle of the control switch is larger for a low input voltage than for a higher input voltage, the current sense resistor conducts current for a shorter time duration for low input voltages than for higher input voltages. Thus, the root mean square (RMS) of a sense current in the current sense resistor and, thus, power dissipation by the current sense resistor, is lower during low input voltages than power dissipation in conventionally located current sense resistors. The RMS of the sense current is approximately constant across a full range of input voltages.

39 Claims, 8 Drawing Sheets

U.S. PATENT DOCUMENTS

| | | | |
|---|---|---|---|
| 4,737,658 A | 4/1988 | Kronmuller et al. | |
| 4,797,633 A | 1/1989 | Humphrey | |
| 4,937,728 A | 6/1990 | Leonardi | |
| 4,940,929 A | 7/1990 | Williams | |
| 4,973,919 A | 11/1990 | Allfather | |
| 4,979,087 A | 12/1990 | Sellwood et al. | |
| 4,980,898 A | 12/1990 | Silvian | |
| 4,992,919 A | 2/1991 | Lee et al. | |
| 4,994,952 A | 2/1991 | Silva et al. | |
| 5,001,620 A | 3/1991 | Smith | |
| 5,003,454 A * | 3/1991 | Bruning | 363/81 |
| 5,055,746 A | 10/1991 | Hu et al. | |
| 5,109,185 A | 4/1992 | Ball | |
| 5,121,079 A | 6/1992 | Dargatz | |
| 5,206,540 A | 4/1993 | da Sa e Silva et al. | |
| 5,264,780 A | 11/1993 | Bruer et al. | |
| 5,278,490 A | 1/1994 | Smedley | |
| 5,323,157 A | 6/1994 | Ledzius et al. | |
| 5,359,180 A | 10/1994 | Park et al. | |
| 5,383,109 A | 1/1995 | Maksimovic et al. | |
| 5,424,932 A | 6/1995 | Inou et al. | |
| 5,477,481 A | 12/1995 | Kerth | |
| 5,479,333 A | 12/1995 | McCambridge et al. | |
| 5,481,178 A | 1/1996 | Wilcox et al. | |
| 5,565,761 A | 10/1996 | Hwang | |
| 5,589,759 A | 12/1996 | Borgato et al. | |
| 5,638,265 A | 6/1997 | Gabor | |
| 5,691,890 A | 11/1997 | Hyde | |
| 5,747,977 A | 5/1998 | Hwang | |
| 5,757,635 A | 5/1998 | Seong | |
| 5,764,054 A | 6/1998 | Choi et al. | |
| 5,768,111 A | 6/1998 | Zaitsu | |
| 5,781,040 A | 7/1998 | Myers | |
| 5,783,909 A | 7/1998 | Hochstein | |
| 5,798,635 A | 8/1998 | Hwang et al. | |
| 5,900,683 A | 5/1999 | Rinehart et al. | |
| 5,912,812 A | 6/1999 | Moriarty, Jr. | |
| 5,929,400 A | 7/1999 | Colby et al. | |
| 5,946,202 A | 8/1999 | Balogh | |
| 5,946,206 A | 8/1999 | Shimizu et al. | |
| 5,952,849 A | 9/1999 | Haigh et al. | |
| 5,960,207 A | 9/1999 | Brown | |
| 5,962,989 A | 10/1999 | Baker | |
| 5,963,086 A | 10/1999 | Hall | |
| 5,966,297 A | 10/1999 | Minegishi | |
| 5,994,885 A | 11/1999 | Wilcox et al. | |
| 6,016,038 A | 1/2000 | Mueller et al. | |
| 6,043,633 A | 3/2000 | Lev et al. | |
| 6,072,969 A | 6/2000 | Yokomori et al. | |
| 6,083,276 A | 7/2000 | Davidson et al. | |
| 6,084,450 A | 7/2000 | Smith et al. | |
| 6,091,233 A | 7/2000 | Hwang | |
| 6,125,046 A | 9/2000 | Jang et al. | |
| 6,150,774 A | 11/2000 | Mueller et al. | |
| 6,181,114 B1 | 1/2001 | Hemena et al. | |
| 6,211,626 B1 | 4/2001 | Lys et al. | |
| 6,211,627 B1 | 4/2001 | Callahan | |
| 6,229,271 B1 | 5/2001 | Liu | |
| 6,229,292 B1 | 5/2001 | Redl et al. | |
| 6,246,183 B1 | 6/2001 | Buonavita | |
| 6,259,614 B1 | 7/2001 | Ribarich et al. | |
| 6,300,723 B1 | 10/2001 | Wang et al. | |
| 6,304,066 B1 | 10/2001 | Wilcox et al. | |
| 6,304,473 B1 | 10/2001 | Telefus et al. | |
| 6,343,026 B1 | 1/2002 | Perry | |
| 6,344,811 B1 | 2/2002 | Melanson | |
| 6,369,525 B1 | 4/2002 | Chang et al. | |
| 6,385,063 B1 | 5/2002 | Sadek et al. | |
| 6,407,514 B1 | 6/2002 | Glaser et al. | |
| 6,407,515 B1 | 6/2002 | Hesler | |
| 6,407,691 B1 | 6/2002 | Yu | |
| 6,441,558 B1 | 8/2002 | Muthu et al. | |
| 6,445,600 B2 | 9/2002 | Ben-Yaakov | |
| 6,452,521 B1 | 9/2002 | Wang | |
| 6,469,484 B2 | 10/2002 | L'Hermite et al. | |
| 6,495,964 B1 | 12/2002 | Muthu et al. | |
| 6,509,913 B2 | 1/2003 | Martin, Jr. et al. | |
| 6,531,854 B2 | 3/2003 | Hwang | |
| 6,580,258 B2 | 6/2003 | Wilcox et al. | |
| 6,583,550 B2 | 6/2003 | Iwasa et al. | |
| 6,628,106 B1 | 9/2003 | Batarseh et al. | |
| 6,636,003 B2 | 10/2003 | Rahm et al. | |
| 6,646,848 B2 | 11/2003 | Yoshida et al. | |
| 6,657,417 B1 | 12/2003 | Hwang | |
| 6,688,753 B2 | 2/2004 | Calon et al. | |
| 6,713,974 B2 | 3/2004 | Patchornik et al. | |
| 6,724,174 B1 | 4/2004 | Esteves et al. | |
| 6,727,832 B1 | 4/2004 | Melanson | |
| 6,737,845 B2 | 5/2004 | Hwang | |
| 6,741,123 B1 | 5/2004 | Melanson et al. | |
| 6,753,661 B2 | 6/2004 | Muthu et al. | |
| 6,756,772 B2 | 6/2004 | McGinnis | |
| 6,768,655 B1 | 7/2004 | Yang et al. | |
| 6,781,351 B2 | 8/2004 | Mednik et al. | |
| 6,788,011 B2 | 9/2004 | Mueller et al. | |
| 6,806,659 B1 | 10/2004 | Mueller et al. | |
| 6,839,247 B1 | 1/2005 | Yang | |
| 6,860,628 B2 | 3/2005 | Robertson et al. | |
| 6,870,325 B2 | 3/2005 | Bushell et al. | |
| 6,873,065 B2 | 3/2005 | Haigh et al. | |
| 6,882,552 B2 | 4/2005 | Telefus et al. | |
| 6,888,322 B2 | 5/2005 | Dowling et al. | |
| 6,894,471 B2 | 5/2005 | Corva et al. | |
| 6,933,706 B2 | 8/2005 | Shih | |
| 6,940,733 B2 | 9/2005 | Schie et al. | |
| 6,944,034 B1 | 9/2005 | Shytenberg et al. | |
| 6,956,750 B1 | 10/2005 | Eason et al. | |
| 6,958,920 B2 | 10/2005 | Mednik et al. | |
| 6,963,496 B2 | 11/2005 | Bimbaud | |
| 6,967,448 B2 | 11/2005 | Morgan et al. | |
| 6,970,503 B1 | 11/2005 | Kalb | |
| 6,975,079 B2 | 12/2005 | Lys et al. | |
| 6,975,523 B2 | 12/2005 | Kim et al. | |
| 6,980,446 B2 | 12/2005 | Simada et al. | |
| 7,003,023 B2 | 2/2006 | Krone et al. | |
| 7,034,611 B2 | 4/2006 | Oswal et al. | |
| 7,050,509 B2 | 5/2006 | Krone et al. | |
| 7,064,498 B2 | 6/2006 | Dowling et al. | |
| 7,064,531 B1 | 6/2006 | Zinn | |
| 7,072,191 B2 | 7/2006 | Nakao et al. | |
| 7,075,329 B2 | 7/2006 | Chen et al. | |
| 7,078,963 B1 | 7/2006 | Andersen et al. | |
| 7,088,059 B2 | 8/2006 | McKinney et al. | |
| 7,099,163 B1 | 8/2006 | Ying | |
| 7,102,902 B1 | 9/2006 | Brown et al. | |
| 7,106,603 B1 | 9/2006 | Lin et al. | |
| 7,109,791 B1 | 9/2006 | Epperson et al. | |
| 7,126,288 B2 | 10/2006 | Ribarich et al. | |
| 7,135,824 B2 | 11/2006 | Lys et al. | |
| 7,145,295 B1 | 12/2006 | Lee et al. | |
| 7,158,633 B1 | 1/2007 | Hein | |
| 7,161,816 B2 | 1/2007 | Shytenberg et al. | |
| 7,180,250 B1 | 2/2007 | Gannon | |
| 7,183,957 B1 | 2/2007 | Melanson | |
| 7,221,130 B2 | 5/2007 | Ribeiro et al. | |
| 7,233,135 B2 | 6/2007 | Noma et al. | |
| 7,246,919 B2 | 7/2007 | Porchia et al. | |
| 7,255,457 B2 | 8/2007 | Ducharm et al. | |
| 7,266,001 B1 | 9/2007 | Notohamiprodjo et al. | |
| 7,276,861 B1 | 10/2007 | Shteynberg et al. | |
| 7,288,902 B1 | 10/2007 | Melanson | |
| 7,292,013 B1 | 11/2007 | Chen et al. | |
| 7,310,244 B2 | 12/2007 | Yang et al. | |
| 7,345,458 B2 | 3/2008 | Kanai et al. | |
| 7,375,476 B2 | 5/2008 | Walter et al. | |
| 7,388,764 B2 | 6/2008 | Huynh et al. | |
| 7,394,210 B2 | 7/2008 | Ashdown | |
| 7,511,437 B2 | 3/2009 | Lys et al. | |
| 7,538,499 B2 | 5/2009 | Ashdown | |
| 7,545,130 B2 | 6/2009 | Latham | |
| 7,554,473 B2 | 6/2009 | Melanson | |
| 7,569,996 B2 | 8/2009 | Holmes et al. | |
| 7,583,136 B2 | 9/2009 | Pelly | |
| 7,642,762 B2 * | 1/2010 | Xie et al. | 323/282 |
| 7,656,103 B2 | 2/2010 | Shteynberg et al. | |
| 7,667,986 B2 | 2/2010 | Artusi et al. | |
| 7,675,758 B2 * | 3/2010 | Artusi et al. | 363/21.01 |

| | | |
|---|---|---|
| 7,710,047 B2 | 5/2010 | Shteynberg et al. |
| 7,719,246 B2 | 5/2010 | Melanson |
| 7,719,248 B1 | 5/2010 | Melanson |
| 7,746,043 B2 | 6/2010 | Melanson |
| 7,746,671 B2 | 6/2010 | Radecker et al. |
| 7,750,738 B2 | 7/2010 | Bach |
| 7,756,896 B1 | 7/2010 | Feingold |
| 7,777,563 B2 | 8/2010 | Midya et al. |
| 7,804,256 B2 | 9/2010 | Melanson |
| 7,804,480 B2 * | 9/2010 | Jeon et al. |
| 7,894,216 B2 * | 2/2011 | Melanson ............... 363/21.13 |
| 2002/0065583 A1 | 5/2002 | Okada |
| 2002/0145041 A1 | 10/2002 | Muthu et al. |
| 2002/0150151 A1 | 10/2002 | Krone et al. |
| 2002/0166073 A1 | 11/2002 | Nguyen et al. |
| 2003/0095013 A1 | 5/2003 | Melanson et al. |
| 2003/0174520 A1 | 9/2003 | Bimbaud |
| 2003/0223255 A1 | 12/2003 | Ben-Yaakov |
| 2004/0004465 A1 | 1/2004 | McGinnis |
| 2004/0046683 A1 | 3/2004 | Mitamura et al. |
| 2004/0085030 A1 | 5/2004 | Laflamme et al. |
| 2004/0085117 A1 | 5/2004 | Melbert et al. |
| 2004/0169477 A1 | 9/2004 | Yancie et al. |
| 2004/0227571 A1 | 11/2004 | Kuribayashi |
| 2004/0228116 A1 | 11/2004 | Miller et al. |
| 2004/0232971 A1 | 11/2004 | Kawasake et al. |
| 2004/0239262 A1 | 12/2004 | Ido et al. |
| 2005/0057237 A1 | 3/2005 | Clavel |
| 2005/0156770 A1 | 7/2005 | Melanson |
| 2005/0168492 A1 | 8/2005 | Hekstra et al. |
| 2005/0184895 A1 | 8/2005 | Petersen et al. |
| 2005/0197952 A1 | 9/2005 | Shea et al. |
| 2005/0207190 A1 | 9/2005 | Gritter |
| 2005/0218838 A1 | 10/2005 | Lys |
| 2005/0222881 A1 | 10/2005 | Booker |
| 2005/0253533 A1 | 11/2005 | Lys et al. |
| 2005/0270813 A1 | 12/2005 | Zhang et al. |
| 2005/0275354 A1 | 12/2005 | Hausman, Jr. et al. |
| 2005/0275386 A1 | 12/2005 | Jepsen et al. |
| 2006/0001381 A1 * | 1/2006 | Robinson et al. ........ 315/185 R |
| 2006/0002110 A1 | 1/2006 | Dowling |
| 2006/0022916 A1 | 2/2006 | Aiello |
| 2006/0023002 A1 | 2/2006 | Hara et al. |
| 2006/0116898 A1 | 6/2006 | Peterson |
| 2006/0125420 A1 | 6/2006 | Boone et al. |
| 2006/0184414 A1 | 8/2006 | Pappas et al. |
| 2006/0214603 A1 | 9/2006 | Oh et al. |
| 2006/0226795 A1 | 10/2006 | Walter et al. |
| 2006/0238136 A1 | 10/2006 | Johnson, III et al. |
| 2006/0261754 A1 | 11/2006 | Lee |
| 2006/0285365 A1 | 12/2006 | Huynh et al. |
| 2007/0024213 A1 | 2/2007 | Shteynberg et al. |
| 2007/0029946 A1 | 2/2007 | Yu et al. |
| 2007/0040512 A1 | 2/2007 | Jungwirth et al. |
| 2007/0053182 A1 | 3/2007 | Robertson |
| 2007/0055564 A1 | 3/2007 | Fourman |
| 2007/0103949 A1 | 5/2007 | Tsuruya |
| 2007/0124615 A1 | 5/2007 | Orr |
| 2007/0126656 A1 | 6/2007 | Huang et al. |
| 2007/0182699 A1 | 8/2007 | Ha et al. |
| 2007/0285031 A1 | 12/2007 | Shteynberg et al. |
| 2008/0012502 A1 | 1/2008 | Lys |
| 2008/0027841 A1 | 1/2008 | Eder |
| 2008/0043504 A1 | 2/2008 | Ye et al. |
| 2008/0054815 A1 | 3/2008 | Kotikalapoodi et al. |
| 2008/0116818 A1 | 5/2008 | Shteynberg et al. |
| 2008/0130322 A1 | 6/2008 | Artusi et al. |
| 2008/0130336 A1 | 6/2008 | Taguchi |
| 2008/0150433 A1 | 6/2008 | Tsuchida et al. |
| 2008/0154679 A1 | 6/2008 | Wade |
| 2008/0174291 A1 | 7/2008 | Hansson et al. |
| 2008/0174372 A1 | 7/2008 | Tucker et al. |
| 2008/0175029 A1 | 7/2008 | Jung et al. |
| 2008/0192509 A1 | 8/2008 | Dhuyvetter et al. |
| 2008/0224635 A1 | 9/2008 | Hayes |
| 2008/0232141 A1 | 9/2008 | Artusi et al. |
| 2008/0239764 A1 | 10/2008 | Jacques et al. |
| 2008/0259655 A1 | 10/2008 | Wei et al. |
| 2008/0278132 A1 | 11/2008 | Kesterson et al. |
| 2009/0067204 A1 | 3/2009 | Ye et al. |
| 2009/0070188 A1 | 3/2009 | Scott et al. |
| 2009/0085546 A1 * | 4/2009 | Phadke et al. ............... 323/284 |
| 2009/0147544 A1 | 6/2009 | Melanson |
| 2009/0174479 A1 | 7/2009 | Yan et al. |
| 2009/0218960 A1 | 9/2009 | Lyons et al. |
| 2010/0141317 A1 | 6/2010 | Szajnowski |

FOREIGN PATENT DOCUMENTS

| | | |
|---|---|---|
| EP | 0585789 A1 | 3/1994 |
| EP | 0632679 | 1/1995 |
| EP | 0838791 | 4/1998 |
| EP | 0910168 A1 | 4/1999 |
| EP | 1014563 | 6/2000 |
| EP | 1164819 A | 12/2001 |
| EP | 1213823 A2 | 6/2002 |
| EP | 1460775 | 9/2004 |
| EP | 1528785 A | 5/2005 |
| EP | 2204905 A1 | 7/2010 |
| GB | 2069269 A | 8/1981 |
| JP | WO 2006/022107 A2 | 3/2006 |
| WO | WO9725836 | 7/1997 |
| WO | 01/15316 A1 | 1/2001 |
| WO | 01/97384 A | 12/2001 |
| WO | 02/15386 A2 | 2/2002 |
| WO | WO0227944 | 4/2002 |
| WO | 02/091805 A2 | 11/2002 |
| WO | WO2006013557 | 2/2006 |
| WO | 2006/067521 A | 6/2006 |
| WO | WO2006135584 | 12/2006 |
| WO | 2007/026170 A | 3/2007 |
| WO | 2007/079362 A | 7/2007 |
| WO | WO2008072160 | 6/2008 |
| WO | WO2008152838 | 12/2008 |

OTHER PUBLICATIONS

Maksimovic, Regan Zane and Robert Erickson, Impact of Digital Control in Power Electronics, Proceedings of 2004 International Symposium on Power Semiconductor Devices & Ics, Kitakyushu, , Apr. 5, 2010, Colorado Power Electronics Center, ECE Department, University of Colorado, Boulder, CO.

Freescale Semiconductor, Inc., Dimmable Light Ballast with Power Factor Correction, Design Reference Manual, DRM067, Rev. 1, Dec. 2005.

J. Zhou et al., Novel Sampling Algorithm for DSP Controlled 2 kW PFC Converter, IEEE Transactions on Power Electronics, vol. 16, No. 2, Mar. 2001.

A. Prodic, Compensator Design and Stability Assessment for Fast Voltage Loops of Power Factor Correction Rectifiers, IEEE Transactions on Power Electronics, vol. 22, No. 5, Sep. 2007.

M. Brkovic et al., "Automatic Current Shaper with Fast Output Regulation and Soft-Switching," S.15.C Power Converters, Telecommunications Energy Conference, 1993.

Dallas Semiconductor, Maxim, "Charge-Pump and Step-Up DC-DC Converter Solutions for Powering White LEDs in Series or Parallel Connections," Apr. 23, 2002.

Freescale Semiconductor, AN3052, Implementing PFC Average Current Mode Control Using the MC9S12E128, Nov. 2005.

D. Maksimovic et al., "Switching Converters with Wide DC Conversion Range," Institute of Electrical and Electronic Engineer's (IEEE) Transactions on Power Electronics, Jan. 1991.

V. Nguyen et al., "Tracking Control of Buck Converter Using Sliding-Mode with Adaptive Hysteresis," Power Electronics Specialists Conference, 1995. PESC apos; 95 Record., 26th Annual IEEE vol. 2, Issue , Jun. 18-22, 1995 pp. 1086-1093.

S. Zhou et al., "A High Efficiency, Soft Switching DC-DC Converter with Adaptive Current-Ripple Control for Portable Applications," IEEE Transactions on Circuits and Systems—II: Express Briefs, vol. 53, No. 4, Apr. 2006.

K. Leung et al., "Use of State Trajectory Prediction in Hysteresis Control for Achieving Fast Transient Response of the Buck Converter," Circuits and Systems, 2003. ISCAS apos;03. Proceedings of the 2003 International Symposium, vol. 3, Issue , May 25-28, 2003 pp. III-439-III-442 vol. 3.

K. Leung et al., "Dynamic Hysteresis Band Control of the Buck Converter with Fast Transient Response," IEEE Transactions on Circuits and Systems—II: Express Briefs, vol. 52, No. 7, Jul. 2005.

Y. Ohno, Spectral Design Considerations for White LED Color Rendering, Final Manuscript, Optical Engineering, vol. 44, 111302 (2005).

S. Skogstad et al., A Proposed Stability Characterization and Verification Method for High-Order Single-Bit Delta-Sigma Modulators, Norchip Conference, Nov. 2006 http://folk.uio.no/savskogs/pub/A_Proposed_Stability_Characterization.pdf.

J. Turchi, Four Key Steps to Design a Continuous Conduction Mode PFC Stage Using the NCP1653, ON Semiconductor, Publication Order No. AND184/D, Nov. 2004.

Megaman, D or S Dimming ESL, Product News, Mar. 15, 2007.

J. Qian et al., New Charge Pump Power-Factor-Correction Electronic Ballast with a Wide Range of Line Input Voltage, IEEE Transactions on Power Electronics, vol. 14, No. 1, Jan. 1999.

P. Green, A Ballast that can be Dimmed from a Domestic (Phase-Cut) Dimmer, IRPLCFL3 rev. b, International Rectifier, http://www.irf.com/technical-info/refdesigns/cfl-3.pdf, printed Mar. 24, 2007.

J. Qian et al., Charge Pump Power-Factor-Correction Technologies Part II: Ballast Applications, IEEE Transactions on Power Electronics, vol. 15, No. 1, Jan. 2000.

Chromacity Shifts in High-Power White LED Systems due to Different Dimming Methods, Solid-State Lighting, http://www.lrc.rpi.edu/programs/solidstate/completedProjects.asp?ID=76, printed May 3, 2007.

S. Chan et al., Design and Implementation of Dimmable Electronic Ballast Based on Integrated Inductor, IEEE Transactions on Power Electronics, vol. 22, No. 1, Jan. 2007.

M. Madigan et al., Integrated High-Quality Rectifier-Regulators, IEEE Transactions on Industrial Electronics, vol. 46, No. 4, Aug. 1999.

T. Wu et al., Single-Stage Electronic Ballast with Dimming Feature and Unity Power Factor, IEEE Transactions on Power Electronics, vol. 13, No. 3, May 1998.

F. Tao et al., "Single-Stage Power-Factor-Correction Electronic Ballast with a Wide Continuous Dimming Control for Fluorescent Lamps," IEEE Power Electronics Specialists Conference, vol. 2, 2001.

Azoteq, IQS17 Family, IQ Switch®—ProxSense™ Series, Touch Sensor, Load Control and User Interface, IQS17 Datasheet V2.00.doc, Jan. 2007.

C. Dilouie, Introducing the LED Driver, EC&M, Sep. 2004.

S. Lee et al., TRIAC Dimmable Ballast with Power Equalization, IEEE Transactions on Power Electronics, vol. 20, No. 6, Nov. 2005.

L. Gonthier et al., EN55015 Compliant 500W Dimmer with Low-Losses Symmetrical Switches, 2005 European Conference on Power Electronics and Applications, Sep. 2005.

Why Different Dimming Ranges? The Difference Between Measured and Perceived Light, 2000 http://www.lutron.com/ballast/pdf/LutronBallastpg3.pdf.

D. Hausman, Real-Time Illumination Stability Systems for Trailing-Edge (Reverse Phase Control) Dimmers, Technical White Paper, Lutron, version 1.0, Dec. 2004, http://www.lutron.com/technical_info/pdf/RTISS-TE.pdf.

Light Dimmer Circuits, www.epanorama.net/documents/lights/lightdimmer.html, printed Mar. 26, 2007.

Light Emitting Diode, http://en.wikipedia.org/wiki/Light-emitting_diode, printed Mar. 27, 2007.

Color Temperature, www.sizes.com/units/color_temperature.htm, printed Mar. 27, 2007.

S. Lee et al., A Novel Electrode Power Profiler for Dimmable Ballasts Using DC Link Voltage and Switching Frequency Controls, IEEE Transactions on Power Electronics, vol. 19, No. 3, May 2004.

Y. Ji et al., Compatibility Testing of Fluorescent Lamp and Ballast Systems, IEEE Transactions on Industry Applications, vol. 35, No. 6, Nov./Dec. 1999.

National Lighting Product Information Program, Specifier Reports, "Dimming Electronic Ballasts," vol. 7, No. 3, Oct. 1999.

Supertex Inc., Buck-based LED Drivers Using the HV9910B, Application Note AN-H48, Dec. 28, 2007.

D. Rand et al., Issues, Models and Solutions for Triac Modulated Phase Dimming of LED Lamps, Power Electronics Specialists Conference, 2007.

Supertex Inc., HV9931 Unity Power Factor LED Lamp Driver, Application Note AN-H52, Mar. 7, 2007.

Supertex Inc., 56W Off-line LED Driver, 120VAC with PFC, 160V, 350mA Load, Dimmer Switch Compatible, DN-H05, Feb. 2007.

ST Microelectronics, Power Factor Corrector L6561, Jun. 2004.

Fairchild Semiconductor, Application Note 42047 Power Factor Correction (PFC) Basics, Rev. 0.9.0 Aug. 19, 2004.

M. Radecker et al., Application of Single-Transistor Smart-Power IC for Fluorescent Lamp Ballast, Thirty-Fourth Annual Industry Applications Conference IEEE, vol. 1, Oct. 3-7, 1999.

M. Rico-Secades et al., Low Cost Electronic Ballast for a 36-W Fluorescent Lamp Based on a Current-Mode-Controlled Boost Inverter for a 120-V DC Bus Power Distribution, IEEE Transactions on Power Electronics, vol. 21, No. 4, Jul. 2006.

Fairchild Semiconductor, FAN4800, Low Start-up Current PFC/PWM Controller Combos, Nov. 2006.

Fairchild Semiconductor, FAN4810, Power Factor Correction Controller, Sep. 24, 2003.

Fairchild Semiconductor, FAN4822, ZVS Average Current PFC Controller, Aug. 10, 2001.

Fairchild Semiconductor, FAN7527B, Power Factor Correction Controller, 2003.

Fairchild Semiconductor, ML4821, Power Factor Controller, Jun. 19, 2001.

Freescale Semiconductor, AN1965, Design of Indirect Power Factor Correction Using 56F800/E, Jul. 2005.

International Search Report for PCT/US2008/051072, mailed Jun. 4, 2008.

Power Integrations, Inc., "TOP200-4/14 TOPSwitch Family Three-terminal Off-line PWM Switch", XP-002524650, Jul. 1996, Sunnyvale, California.

Texas Instruments, SLOS318F, "High-Speed, Low Noise, Fully-Differential I/O Amplifiers," THS4130 and THS4131, US, Jan. 2006.

International Search Report and Written Opinion, PCT US20080062387, dated Feb. 5, 2008.

International Search Report and Written Opinion, PCT US200900032358, dated Jan. 29, 2009.

Hirota, Atsushi et al, "Analysis of Single Switch Delta-Sigma Modulated Pulse Space Modulation PFC Converter Effectively Using Switching Power Device," IEEE, US, 2002.

Prodic, Aleksandar, "Digital Controller for High-Frequency Rectifiers with Power Factor Correction Suitable for On-Chip Implementation," IEEE, US, 2007.

International Search Report and Written Opinion, PCT US20080062378, dated Feb. 5, 2008.

International Search Report and Written Opinion, PCT US20090032351, dated Jan. 29, 2009.

Erickson, Robert W. et al, "Fundamentals of Power Electronics," Second Edition, Chapter 6, Boulder, CO, 2001.

Allegro Microsystems, A1442, "Low Voltage Full Bridge Brushless DC Motor Driver with Hall Commutation and Soft-Switching, and Reverse Battery, Short Circuit, and Thermal Shutdown Protection," Worcester MA, 2009.

Texas Instruments, SLUS828B, "8-Pin Continuous Conduction Mode (CCM) PFC Controller", UCC28019A, US, revised Apr. 2009.

Analog Devices, "120 kHz Bandwidth, Low Distortion, Isolation Amplifier", AD215, Norwood, MA, 1996.

Burr-Brown, ISO120 and ISO121, "Precision Los Cost Isolation Amplifier," Tucson AZ, Mar. 1992.

Burr-Brown, ISO130, "High IMR, Low Cost Isolation Amplifier," SBOS220, US, Oct. 2001.

International Search Report and Written Report PCT US20080062428 dated Feb. 5, 2008.

Prodic, A. et al, "Dead Zone Digital Controller for Improved Dynamic Response of Power Factor Preregulators," IEEE, 2003.

"HV9931 Unity Power Factor LED Lamp Driver, Initial Release", Supertex Inc., Sunnyvale, CA USA 2005.

AN-H52 Application Note: "HV9931 Unity Power Factor LED Lamp Driver" Mar. 7, 2007, Supertex Inc., Sunnyvale, CA, USA.

Dustin Rand et al: "Issues, Models and Solutions for Triac Modulated Phase Dimming of LED Lamps" Power Electronics Specialists Conferrence, 2007. PESC 2007. IEEE, P1, Jun. 1, 2007, pp. 1398-1404.
Spiazzi G et al: "Analysis of a High-Power Factor Electronic Ballast for High Brightness Light Emitting Diodes" Power Electronics Specialists, 2005 IEEE 36th Conference on Jun. 12, 2005, Piscatawa, NJ, USA, IEEE, pp. 1494-1499.
International Search Report PCT/US2008/062381 dated Feb. 5, 2008.
International Search Report PCT/US2008/056739 dated Dec. 3, 2008.
Written Opinion of the International Searching Authority PCT/US2008/062381 dated Feb. 5, 2008.
Ben-Yaakov et al, "The Dynamics of a PWM Boost Converter with Resistive Input" IEEE Transactions on Industrial Electronics, IEEE Service Center, Piscataway, NJ, USA, vol. 46, No. 3, Jun. 1, 1999.
International Search Report PCT/US2008/062398 dated Feb. 5, 2008.
Partial International Search Report PCT/US2008/062387 dated Feb. 5, 2008.
Noon, Jim "UC3855A/B High Performance Power Factor Preregulator", Texas Instruments, SLUA146A, May 1996, Revised Apr. 2004.
International Search Report PCT/GB2006/003259 dated Jan. 12, 2007.
Written Opinion of the International Searching Authority PCT/US2008/056739 dated Dec. 3, 2008.
International Search Report PCT/US2008/056606 dated Dec. 3, 2008.
Written Opinion of the International Searching Authority PCT/US2008/056606 dated Dec. 3, 2008.
International Search Report PCT/US2008/056608 dated Dec. 3, 2008.
Written Opinion of the International Searching Authority PCT/US2008/056608 dated Dec. 3, 2008.
International Search Report PCT/GB2005/050228 dated Mar. 14, 2006.
International Search Report PCT/US2008/062387 dated Jan. 10, 2008.
Data Sheet LT3496 Triple Output LED Driver, Linear Technology Corporation, Milpitas, CA 2007.
Linear Technology, News Release,Triple Output LED, LT3496, Linear Technology, Milpitas, CA, May 24, 2007.
Mamano, Bob, "Current Sensing Solutions for Power Supply Designers", Unitrode Seminar Notes SEM1200, 1999.
http://toolbarpdf.com/docs/functions-and-features-of-inverters.html printed on Jan. 20, 2011.
Linear Technology, "Single Switch PWM Controller with Auxiliary Boost Converter," LT1950 Datasheet, Linear Technology, Inc. Milpitas, CA, 2003.
Yu, Zhenyu, 3.3V DSP for Digital Motor Control, Texas Instruments, Application Report SPRA550 dated Jun. 1999.
International Rectifier, Data Sheet No. PD60143-O, Current Sensing Single Channel Driver, El Segundo, CA, dated Sep. 8, 2004.
Balogh, Laszlo, "Design and Application Guide for High Speed MOSFET Gate Drive Circuits" [Online] 2001, Texas Instruments, Inc., SEM-1400, Unitrode Power Supply Design Seminar, Topic II, TI literature No. SLUP133, XP002552367, Retrieved from the Internet: URL:htt/://focus.ti.com/lit/ml/slup169/slup169.pdf the whole document.
PCT US2009/051746 International Search Report and Written Opinion dated Sep. 1, 2009.
"AN-H52 Application Note: HV9931 Unity Power Factor LED Lamp Driver" Mar. 7, 2007, Supertex Inc., Sunnyvale, CA, USA.
Dustin Rand et al: "Issues, Models and Solutions for Triac Modulated Phase Dimming of LED Lamps" Power Electronics Specialists Conference, 2007. PESC 2007, IEEE, P1, Jun. 1, 2007, pp. 1398-1404.
Spiazzi G et al: "Analysis of a High-Power-Factor Electronic Ballast for High Brightness Light Emitting Diodes" Power Electronics Specialists, 2005 IEEE 36th Conference on Jun. 12, 2005, Piscatawa, NJ USA, IEEE, pp. 1494-1499.
Partial International Search PCT/US2008/062387 dated Feb. 5, 2008.
"High Performance Power Factor Preregulator", Unitrode Products from Texas Instruments, SLUS382B, Jun. 1998, Revised Oct. 2005.
Written Opinion of the International Searching Authority PCT/US2008/056739.
International Search PCT/US2008/062387 dated Jan. 10, 2008.
Data Sheet LT3496 Triple Output LED Driver, 2007, Linear Technology Corporation, Milpitas, CA.
News Release, Triple Output LED, LT3496.
Texas Instruments, Interleaving Continuous Conduction Mode PFC Controller, UCC28070, SLUS794C, Nov. 2007, revised Jun. 2009, Texas Instruments, Dallas TX.
D. Hausman, Lutron, RTISS-TE Operation, Real-Time Illumination Stability Systems for Trailing-Edge (Reverse Phase Control) Dimmers, v. 1.0 Dec. 2004.
International Rectifier, Data Sheet No. PD60230 revC, IR1150(S)(PbF), uPFC One Cycle Control PFC IC Feb. 5, 2007.
Texas Instruments, Application Report SLUA308, UCC3817 Current Sense Transformer Evaluation, Feb. 2004.
Texas Instruments, Application Report SPRA902A, Average Current Mode Controlled Power Factor Correctiom Converter using TMS320LF2407A, Jul. 2005.
Unitrode, Design Note DN-39E, Optimizing Performance in UC3854 Power Factor Correction Applications, Nov. 1994.
Fairchild Semiconductor, Application Note 42030, Theory and Application of the ML4821 Average Currrent Mode PFC Controller, Aug. 1997.
Fairchild Semiconductor, Application Note AN4121, Design of Power Factor Correction Circuit Using FAN7527B, Rev.1.0.1, May 30, 2002.
Fairchild Semiconductor, Application Note 6004, 500W Power-Factor-Corrected (PFC) Converter Design with FAN4810, Rev. 1.0.1, Oct. 31, 2003.
Fairchild Semiconductor, FAN4822, ZVA Average Current PFC Controller, Rev. 1.0.1 Aug. 10, 2001.
Fairchild Semiconductor, ML4821, Power Factor Controller, Rev. 1.0.2, Jun. 19, 2001.
Fairchild Semiconductor, ML4812, Power Factor Controller, Rev. 1.0.4, May 31, 2001.
Linear Technology, 100 Watt LED Driver, Linear Technology, 2006.
Fairchild Semiconductor, FAN7544, Simple Ballast Controller, Rev. 1.0.0, 2004.
Fairchild Semiconductor, FAN7532, Ballast Controller, Rev. 1.0.2, Jun. 2006.
Fairchild Semiconductor, FAN7711, Ballast Control IC, Rev. 1.0.2, Mar. 2007.
Fairchild Semiconductor, KA7541, Simple Ballast Controller, Rev. 1.0.3, 2001.
ST Microelectronics, L6574, CFL/TL Ballast Driver Preheat and Dimming, Sep. 2003.
ST Microelectronics, AN993, Application Note, Electronic Ballast with PFC Using L6574 and L6561, May 2004.
International Search Report and Written Opinion for PCT/US2008/062384 dated Jan. 14, 2008.
S. Dunlap et al., Design of Delta-Sigma Modulated Switching Power Supply, Circuits & Systems, Proceedings of the 1998 IEEE International Symposium, 1998.
Infineon, CCM-PFC Standalone Power Factor Correction (PFC) Controller in Continuous Conduction Mode (CCM), Version 2.1, Feb. 6, 2007.
International Rectifier, IRAC1150-300W Demo Board, User's Guide, Rev 3.0, Aug. 2, 2005.
International Rectifier, Application Note AN-1077,PFC Converter Design with IR1150 One Cycle Control IC, rev. 2.3, Jun. 2005.
International Rectifier, Data Sheet PD60230 revC, Feb. 5, 2007.
Lu et al., International Rectifier, Bridgeless PFC Implementation Using One Cycle Control Technique, 2005.
Linear Technology, LT1248, Power Factor Controller, Apr. 20, 2007.
ON Semiconductor, AND8123/D, Power Factor Correction Stages Operating in Critical Conduction Mode, Sep. 2003.
ON Semiconductor, MC33260, GreenLine Compact Power Factor Controller: Innovative Circuit for Cost Effective Solutions, Sep. 2005.

ON Semiconductor, NCP1605, Enhanced, High Voltage and Efficient Standby Mode, Power Factor Controller, Feb. 2007.

ON Semconductor, NCP1606, Cost Effective Power Factor Controller, Mar. 2007.

ON Semiconductor, NCP1654, Product Review, Power Factor Controller for Compact and Robust, Continuous Conduction Mode Pre-Converters, Mar. 2007.

Philips, Application Note, 90W Resonant SMPS with TEA1610 SwingChip, AN99011, 1999.

NXP, TEA1750, GreenChip III SMPS control IC Product Data Sheet, Apr. 6, 2007.

Renesas, HA16174P/FP, Power Factor Correction Controller IC, Jan. 6, 2006.

Renesas Technology Releases Industry's First Critical-Conduction-Mode Power Factor Correction Control IC Implementing Interleaved Operation, Dec. 18, 2006.

Renesas, Application Note R2A20111 EVB, PFC Control IC R2A20111 Evaluation Board, Feb. 2007.

STMicroelectronics, L6563, Advanced Transition-Mode PFC Controller, Mar. 2007.

Texas Instruments, Application Note SLUA321, Startup Current Transient of the Leading Edge Triggered PFC Controllers, Jul. 2004.

Texas Instruments, Application Report, SLUA309A, Avoiding Audible Noise at Light Loads when using Leading Edge Triggered PFC Converters, Sep. 2004.

Texas Instruments, Application Report SLUA369B, 350-W, Two-Phase Interleaved PFC Pre-Regulator Design Review, Mar. 2007.

Unitrode, High Power-Factor Preregulator, Oct. 1994.

Texas Instruments, Transition Mode PFC Controller, SLUS515D, Jul. 2005.

Unitrode Products From Texas Instruments, Programmable Output Power Factor Preregulator, Dec. 2004.

Unitrode Products From Texas Instruments, High Performance Power Factor Preregulator, Oct. 2005.

Texas Instruments, UCC3817 BiCMOS Power Factor Preregulator Evaluation Board User's Guide, Nov. 2002.

Unitrode, L. Balogh, Design Note UC3854A/B and UC3855A/B Provide Power Limiting with Sinusoidal Input Current for PFC Front Ends, SLUA196A, Nov. 2001.

A. Silva De Morais et al., A High Power Factor Ballast Using a Single Switch with Both Power Stages Integrated, IEEE Transactions on Power Electronics, vol. 21, No. 2, Mar. 2006.

M. Ponce et al., High-Efficient Integrated Electronic Ballast for Compact Fluorescent Lamps, IEEE Transactions on Power Electronics, vol. 21, No. 2, Mar. 2006.

A. R. Seidel et al., A Practical Comparison Among High-Power-Factor Electronic Ballasts with Similar Ideas, IEEE Transactions on Industry Applications, vol. 41, No. 6, Nov.-Dec. 2005.

F. T. Wakabayashi et al., An Improved Design Procedure for LCC Resonant Filter of Dimmable Electronic Ballasts for Fluorescent Lamps, Based on Lamp Model, IEEE Transactions on Power Electronics, vol. 20, No. 2, Sep. 2005.

J. A. Vilela Jr. et al., An Electronic Ballast with High Power Factor and Low Voltage Stress, IEEE Transactions on Industry Applications, vol. 41, No. 4, Jul./Aug. 2005.

S. T.S. Lee et al., Use of Saturable Inductor to Improve the Dimming Characteristics of Frequency-Controlled Dimmable Electronic Ballasts, IEEE Transactions on Power Electronics, vol. 19, No. 6, Nov. 2004.

M. K. Kazimierczuk et al., Electronic Ballast for Fluorescent Lamps, IEEE Transactions on Power Electronics, vol. 8, No. 4, Oct. 1993.

S. Ben-Yaakov et al., Statics and Dynamics of Fluorescent Lamps Operating at High Frequency: Modeling and Simulation, IEEE Transactions on Industry Applications, vol. 38, No. 6, Nov.-Dec. 2002.

H. L. Cheng et al., A Novel Single-Stage High-Power-Factor Electronic Ballast with Symmetrical Topology, IEEE Transactions on Power Electronics, vol. 50, No. 4, Aug. 2003.

J.W.F. Dorleijn et al., Standardisation of the Static Resistances of Fluorescent Lamp Cathodes and New Data for Preheating, Industry Applications Conference, vol. 1, Oct. 13-18, 2002.

Q. Li et al., An Analysis of the ZVS Two-Inductor Boost Converter under Variable Frequency Operation, IEEE Transactions on Power Electronics, vol. 22, No. 1, Jan. 2007.

H. Peng et al., Modeling of Quantization Effects in Digitally Controlled DC-DC Converters, IEEE Transactions on Power Electronics, vol. 22, No. 1, Jan. 2007.

G. Yao et al., Soft Switching Circuit for Interleaved Boost Converters, IEEE Transactions on Power Electronics, vol. 22, No. 1, Jan. 2007.

C. M. De Oliviera Stein et al., A ZCT Auxiliary Communication Circuit for Interleaved Boost Converters Operating in Critical Conduction Mode, IEEE Transactions on Power Electronics, vol. 17, No. 6, Nov. 2002.

W. Zhang et al., A New Duty Cycle Control Strategy for Power Factor Correction and FPGA Implementation, IEEE Transactions on Power Electronics, vol. 21, No. 6, Nov. 2006.

H. Wu et al., Single Phase Three-Level Power Factor Correction Circuit with Passive Lossless Snubber, IEEE Transactions on Power Electronics, vol. 17, No. 2, Mar. 2006.

O. Garcia et al., High Efficiency PFC Converter to Meet EN61000-3-2 and A14, Proceedings of the 2002 IEEE International Symposium on Industrial Electronics, vol. 3, 2002.

P. Lee et al., Steady-State Analysis of an Interleaved Boost Converter with Coupled Inductors, IEEE Transactions on Industrial Electronics, vol. 47, No. 4, Aug. 2000.

D.K.W. Cheng et al., A New Improved Boost Converter with Ripple Free Input Current Using Coupled Inductors, Power Electronics and Variable Speed Drives, Sep. 21-23, 1998.

B.A. Miwa et al., High Efficiency Power Factor Correction Using Interleaved Techniques, Applied Power Electronics Conference and Exposition, Seventh Annual Conference Proceedings, Feb. 23-27, 1992.

Z. Lai et al., A Family of Power-Factor-Correction Controllers, Twelfth Annual Applied Power Electronics Conference and Exposition, vol. 1, Feb. 23-27, 1997.

L. Balogh et al., Power-Factor Correction with Interleaved Boost Converters in Continuous-Inductor-Current Mode, Eighth Annual Applied Power Electronics Conference and Exposition, 1993. APEC '93. Conference Proceedings, Mar. 7-11, 1993.

Fairchild Semiconductor, Application Note 42030, Theory and Application of the ML4821 Average Current Mode PFC Controller, Oct. 25, 2000.

Unitrode Products From Texas Instruments, BiCMOS Power Factor Preregulator, Feb. 2006.

* cited by examiner

CURRENT SENSING IN A SWITCHING POWER CONVERTER

CROSS-REFERENCE TO RELATED APPLICATION

This application claims priority under 35 U.S.C. §119(e) to U.S. Provisional Application No. 61/083,717, filed Jul. 25, 2008.

BACKGROUND OF THE INVENTION

1. Field of the Invention

The present invention relates in general to the field of signal processing, and more specifically to current sensing in a switching power converter.

2. Description of the Related Art

Power control systems often utilize a switching power converter to convert alternating current (AC) voltages to direct current (DC) voltages or DC-to-DC. Switching power converters often include a nonlinear energy transfer process to provide power factor corrected energy to a load. Power control systems provide power factor corrected and regulated output voltages to many devices that utilize a regulated output voltage.

FIG. 1 represents a power control system 100, which includes a switching power converter 102. Voltage source 101 supplies an alternating current (AC) input voltage $V_{in}$ to a full bridge diode rectifier 103. The voltage source 101 is, for example, a public utility, and the AC voltage $V_{in}$ is, for example, a 60 Hz/110 V line voltage in the United States of America or a 50 Hz/220 V line voltage in Europe. The rectifier 103 rectifies the input voltage $V_{in}$ and supplies a rectified, time-varying, line input voltage $V_X$ to the switching power converter 102.

The power control system 100 includes a PFC and output voltage controller 114 to control power factor correction and regulate an output voltage $V_C$ of switching power converter 102. Switch 108 is a control switch. The PFC and output voltage controller 114 controls an ON (i.e. conductive) and OFF (i.e. nonconductive) state of switch 108 by varying a state of pulse width modulated control signal $CS_0$. Switching between states of switch 108 regulates the transfer of energy from the rectified line input voltage $V_X$ through inductor 110 to capacitor 106. The inductor current $i_L$ ramps 'up' when the switch 108 conducts, i.e. is "ON". The inductor current $i_L$ ramps down when switch 108 is nonconductive, i.e. is "OFF", and supplies current $i_L$ to recharge capacitor 106. The time period during which inductor current $i_L$ ramps down is commonly referred to as the "inductor flyback time". During the inductor flyback time, boost diode 111 is forward biased. Diode 111 prevents reverse current flow into inductor 110 when switch 108 is OFF. In at least one embodiment, the switching power converter 102 operates in discontinuous current mode, i.e. the inductor current $i_L$ ramp up time plus the inductor flyback time is less than the period of the control signal $CS_0$, which controls the conductivity of switch 108.

When switching power converter 102 operates in discontinuous conduction mode, input current $i_L$ is proportionate to the 'on-time' of switch 108, and the energy transferred to inductor 110 is proportionate to the 'on-time' squared. Thus, the energy transfer process is one embodiment of a nonlinear process. In at least one embodiment, control signal $CS_0$ is a pulse width modulated signal, and the switch 108 is a field effect transistor (FET), such as an n-channel FET. Control signal $CS_0$ is a gate voltage of switch 108, and switch 108 conducts when the pulse width of $CS_0$ is high. Thus, the 'on-time' of switch 108 is determined by the pulse width of control signal $CS_0$. Accordingly, the energy transferred to inductor 110 is proportionate to a square of the pulse width of control signal $CS_0$.

Capacitor 106 supplies stored energy to load 112. The capacitor 106 is sufficiently large so as to maintain a substantially constant output voltage $V_C$, as established by PFC and output voltage controller 114. The output voltage $V_C$ remains substantially constant during constant load conditions. However, as load conditions change, the output voltage $V_C$ changes. The PFC and output voltage controller 114 responds to the changes in $V_C$ and adjusts the control signal $CS_0$ to restore a substantially constant output voltage as quickly as possible. The switching power converter 102 includes a small capacitor 115 to filter any high frequency signals from the line input voltage $V_X$.

The PFC and output voltage controller 114 controls power factor correction of switching power converter 102 and an amount of energy transferred to load 112. The goal of power factor correction technology is to make the switching power converter 102 appear resistive to the voltage source 101. Thus, PFC and output voltage controller 114 attempts to control the inductor current $i_L$ so that the average inductor current $i_L$ is linearly and directly related to the line input voltage $V_X$. The PFC and output voltage controller 114 controls the pulse width (PW) and period (TT) of control signal $CS_0$ so that a desired amount of energy is transferred to capacitor 106. The desired amount of energy depends upon the voltage and current requirements of load 112.

To regulate the amount of energy transferred and maintain a power factor close to one, PFC and output voltage controller 114 varies the period of control signal $CS_0$ so that the input current $i_L$ tracks the changes in input voltage $V_X$ and holds the output voltage $V_C$ constant. Thus, as the input voltage $V_X$ increases, PFC and output voltage controller 114 increases the period TT of control signal $CS_0$, and as the input voltage $V_X$ decreases, PFC and output voltage controller 114 decreases the period of control signal $CS_0$. At the same time, the pulse width PW of control signal $CS_0$ is adjusted to maintain a constant duty cycle (D) of control signal $CS_0$, and, thus, hold the output voltage $V_C$ constant. In at least one embodiment, the PFC and output voltage controller 114 updates the control signal $CS_0$ at a frequency much greater than the frequency of input voltage $V_X$. The frequency of input voltage $V_X$ is generally 50-60 Hz. The frequency 1/TT of control signal $CS_0$ is, for example, between 20 kHz and 130 kHz. Frequencies at or above 20 kHz avoid audio frequencies and frequencies at or below 130 kHz avoid significant switching inefficiencies while still maintaining good power factor, e.g. between 0.9 and 1, and an approximately constant output voltage $V_C$.

In addition to sensing input voltage $V_X$ and output voltage $V_C$, PFC and output voltage controller 114 also senses current $i_{Rsense\_0}$ across current sense resistor 116. Current sense resistor 116 is connected to switch 108 and rectifier 103 on an input side of power control system 100. PFC and output voltage controller 114 senses current $i_{Rsense\_0}$ by sensing the voltage across current sense resistor 116 and determining the sense current $i_{Rsense\_0}$ from the sensed voltage and the known value of sense resistor 116.

Referring to FIG. 2, signal graphs 200 depict the relationship between sense current $i_{Rsense\_0}$ and control signal $CS_0$ for a high root mean square (RMS) input voltage $V_{X\_HIGH}$ $_{RMS}$ and a low voltage input voltage $V_{X\_LOW\ RMS}$. Signal graphs 200 depict three exemplary periods T(0), T(1), and T(2) of control signal $CS_0$ and sense current $i_{Rsense\_0}$. In at least one embodiment, the time marks $t_0$ through $t_9$ mark identical time for FIGS. 2, 4, and 6 for comparison purposes. The input voltage $V_X$ can vary by a few volts due to slight load changes or other causes or vary by at least tens of volts due to, for example, dramatic surges in power demand. The input voltage $V_X$ can also vary due to, for example, traveling from a country with a 110 V nominal line input voltage $V_{in}$ to a country with a 220 V nominal line input voltage $V_{in}$. The sense resistor 116 is sized to produce a measurable signal for both a high RMS input voltage $V_{X\_HIGH\ RMS}$ and a low voltage input voltage $V_{X\_LOW\ RMS}$.

In general, when control signal $CS_0$ is high, switch 108 conducts ("ON") and inductor current $i_L$ flows through both switch 108 and current sense resistor 116. The sense current $i_{Rsense\_0}$ tracks the inductor current $i_L$ and increases while control signal $CS_0$ is high. When control signal $CS_0$ is low, the inductor current $i_L$ decreases and, thus, the sense current $i_{Rsense\_0}$ decreases, until the control signal $CS_0$ is high again. The signal graphs 200 depict operation of switching power converter 102 in continuous conduction mode. In continuous conduction mode, the sense current $i_{Rsense\_0}$ is always either increasing or decreasing. Thus, the sense resistor 116 (FIG. 1) conducts current for the entire period of control signal $CS_0$ in continuous conduction mode.

For the low RMS input voltage $V_{X\_LOW RMS}$, the duty cycle of control signal $CS_0$ is larger than the duty cycle of the high RMS input voltage $V_{X\_HIGH\ RMS}$ because more current is needed by load 112 to supply the power demand of load 112. ("Duty cycle" is the ratio of the high time of control signal $CS_0$ to the period of control signal $CS_0$.) Because the sense current $i_{Rsense\_0}$ continues to increase when control signal $CS_0$ is high, a larger duty cycle of control signal $CS_0$ results in a larger average sense current $i_{Rsense\_0}$ for the low RMS input voltage $V_{X\_LOW\ RMS}$ relative to the high RMS input voltage $V_{X\_HIGH\ RMS}$. Consequently, the combination of a high sense current $i_{Rsense\_0}$ and a high duty cycle result in a large power dissipation in the current sense resistor 116 during the low RMS input voltage $V_{X\_LOW\ RMS}$. Thus, the largest power dissipation occurs during the low RMS input voltage $V_{X\_LOW\ RMS}$ when efficiency of the switching power converter 102 is generally lower. In at least one embodiment, power losses are a combination of $i^2R$ losses for resistive elements, switching losses proportional to $i_L \cdot V_X$, and capacitive losses proportional to $CV^2$. In at least one embodiment, low RMS input voltage $V_{X\_LOW\ RMS}$ represent the highest current $i_L$ and the highest $i^2R$ losses. In at least one embodiment, the other losses do not change or the rise is negligible compared to the $i^2R$ loss increase. Thus, in at least one embodiment, the $i^2R$ losses either dominate or rise faster than other losses fall.

Referring to FIGS. 3 and 4, power control system 300 is identical to power control system 100 except the current sense resistor 116 is replaced with a current sense resistor 302. FIG. 4 depicts signal graphs 300 with power control system 300 operating in continuous conduction mode. Current sense resistor 302 is connected in series with switch 108 and conducts sense current $i_{Rsense\_1}$. Thus, sense current $i_{Rsense\_1}$ is zero when switch 108 is nonconductive, and sense current $i_{Rsense\_1}$ increases as inductor current $i_L$ increases when switch 108 conducts. As discussed in conjunction with FIG. 2, the duty cycle of control signal $CS_1$ is high during low RMS voltage $V_{X\_LOW\ RMS}$ and low during high RMS voltage $V_{X\_HIGH\ RMS}$. Thus, the average sense current $i_{Rsense\_1}$ is higher during low RMS voltage $V_{X\_LOW RMS}$ than during high RMS voltage $V_{X\_HIGH\ RMS}$. Power control system 300 reduces the overall power dissipation of current sense resistor 302 versus the power dissipation of current resistor 116 (FIG. 1) since current sense resistor 302 only dissipates power when control signal $CS_1$ is high. However, as with power control system 100, the largest power dissipation occurs during the low RMS input voltage $V_{X\_LOW\ RMS}$ when efficiency of the switching power converter 102 is generally lower.

SUMMARY OF THE INVENTION

In one embodiment of the present invention, an apparatus includes a switching power converter to boost an input voltage to the switching power converter to a higher output voltage during operation of the switching power converter. The switching power converter includes a switch to control current to an output node of the switching power converter. The switching power converter also includes a current sense resistor coupled to the output node of the switching power converter. During operation of the switching power conductor current flows through the current sense resistor only when the switch is nonconductive.

In another embodiment of the present invention, an apparatus includes a switching power converter. The switching power converter includes a first input node of the switching power converter, a second input node of the switching power converter, and a first output node of the switching power converter. The switching power converter also includes a second output node of the switching power converter, an inductor coupled between the first input node and the second output node of the switching power converter, and a switch having a first node coupled to the inductor and a second node coupled to the second output node of the switching power converter. The switching power converter further includes a diode having a first node coupled to the second node of the switch and a second node coupled to first output node of the switching power converter and a current sense resistor coupled between the second output node of the switching power converter and the second node of the switch.

In a further embodiment of the present invention, a method includes boosting an input voltage to a switching power converter to a higher output voltage of the switching power converter. The method also includes operating a switch to control current to an output terminal of a switching power converter and generating a signal representing the current using a current sense resistor, wherein during operation of the switching power conductor current flows through the current sense resistor only when the switch is nonconductive.

In another embodiment of the present invention, an apparatus includes means to boost an input voltage to a switching power converter to a higher output voltage of the switching power converter. The apparatus also includes means to operate a switch to control current to an output terminal of a switching power converter and means to sense the current using a current sense resistor, wherein during operation of the switching power conductor current flows through the current sense resistor only when the switch is nonconductive.

In a further embodiment of the present invention, an integrated circuit to control a switching power converter includes a power factor correction controller having at least one input to receive a sense signal representative of a current of the switching power converter. The switching power converter includes a switch. The sense signal represents current in the switching power converter only when the switch is nonconductive, and the power factor correction controller is configured to generate a control signal to control conductivity of the switch and controlling conductivity of the switch controls power factor correction of the switching power converter.

In another embodiment of the present invention, a method of control a switching power converter includes receiving a sense signal representative of a current of the switching power converter, wherein the switching power converter includes a switch and the sense signal represents current in the switching power converter only when the switch is nonconductive. The method also includes generating a control signal to control conductivity of the switch, wherein controlling conductivity of the switch controls power factor correction of the switching power converter.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

At least one embodiment of a power control system includes a current sense resistor located on an output side of a switching power converter. In at least one embodiment, the current sense resistor is located in series with a boost diode of the switching power converter. By locating the current sense resistor on the output side of the switching power converter, in at least one embodiment, the current sense resistor conducts a sense current when a control switch of the switching power converter is nonconductive. Since a duty cycle of the control switch is larger for a low input voltage than for a higher input voltage, the current sense resistor conducts current for a shorter time duration for low input voltages than for higher input voltages. Thus, in at least one embodiment, the root mean square (RMS) of a sense current in the current sense resistor and, thus, power dissipation by the current sense resistor, is lower during low input voltages than power dissipation in conventionally located current sense resistors. Additionally, in at least one embodiment, the worst case power dissipation loss by the current sense resistor is significantly less than the power dissipation loss by conventional current sense resistors in conventional locations. For example, in at least one embodiment, the power dissipation loss at a lowest line input voltage for the current sense resistor is less than 50% of the power dissipation loss of a conventional current sense resistor in a conventional location.

In at least one embodiment, the power control system includes a power factor correction (PFC) controller to control a switching power converter. In at least one embodiment, the PFC controller receives a sense signal representative of a current of the switching power converter. The sense signal is, for example, a voltage developed across a current sense resistor. The sense signal represents current in the switching power converter only when the switch is nonconductive. The power factor correction controller generates a control signal to control conductivity of the switch and controlling conductivity of the switch controls power factor correction of the switching power converter.

Figure 1:
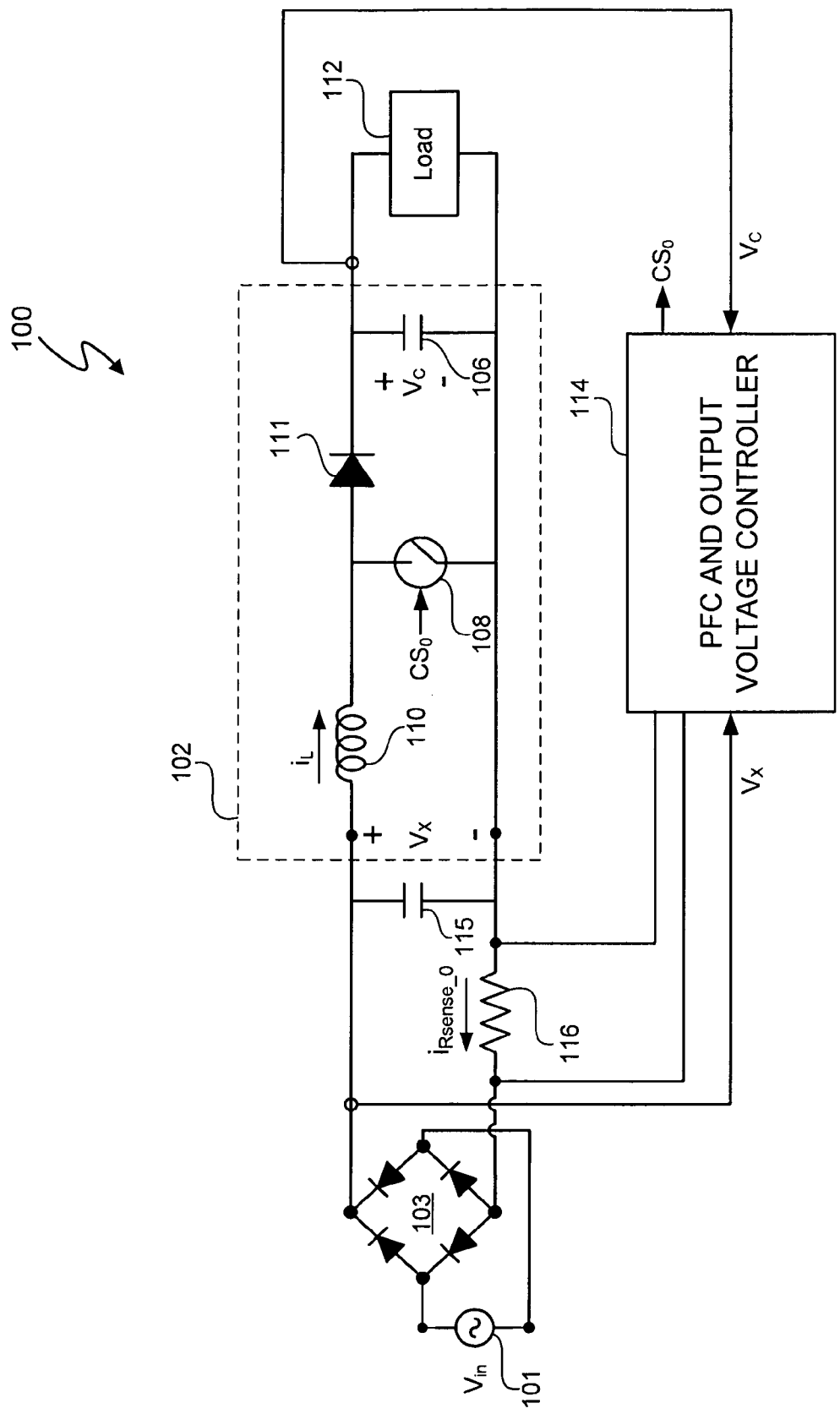
FIG. 1 (labeled prior art) depicts a power control system with a current sense resistor located on an input side of a switching power converter.
Figure 2:
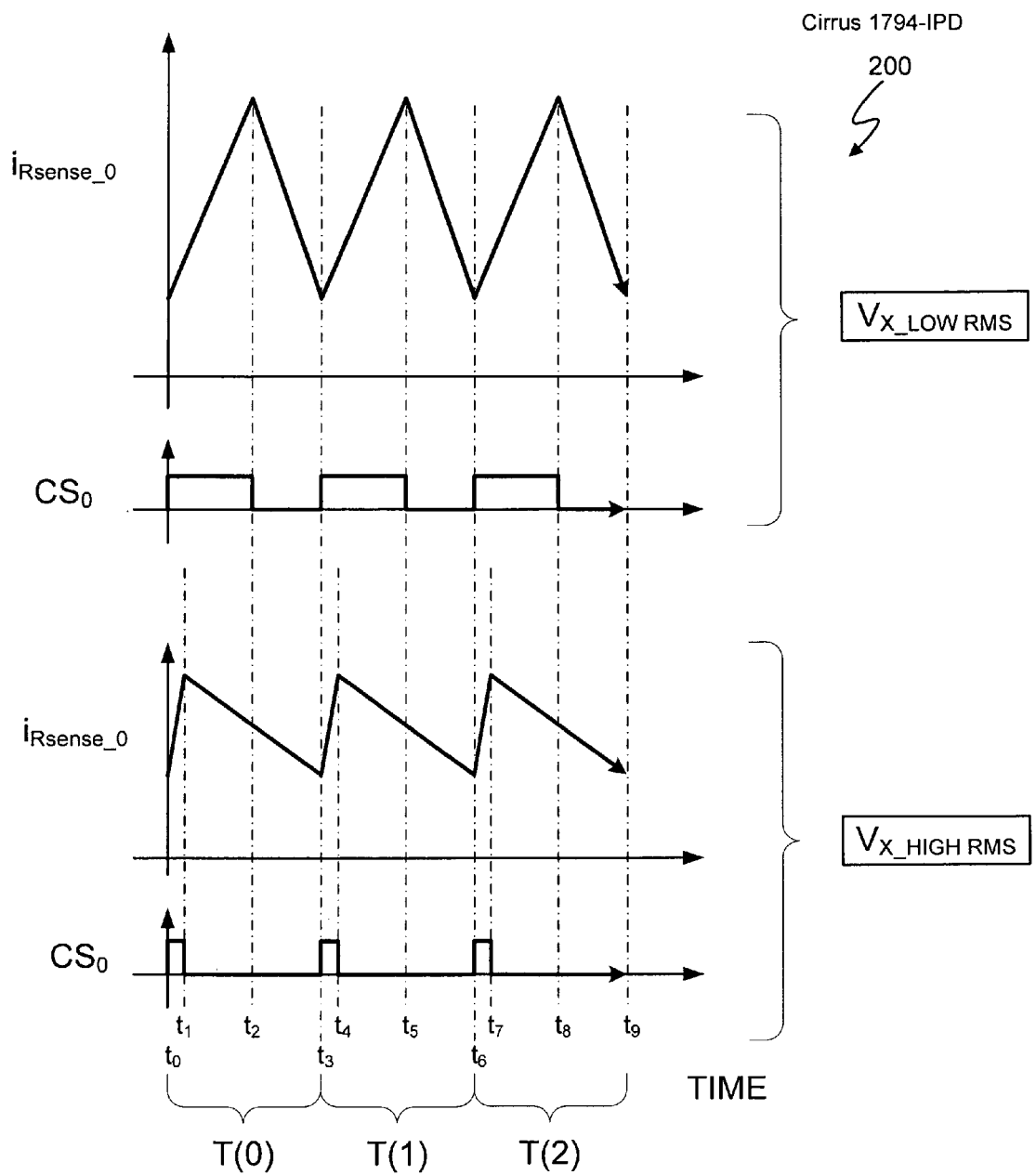
FIG. 2 (labeled prior art) depicts signal graphs of sense currents and switch control signals for the power control system of FIG. 1 during a low RMS input voltage and during a high RMS input voltage.
Figure 3:
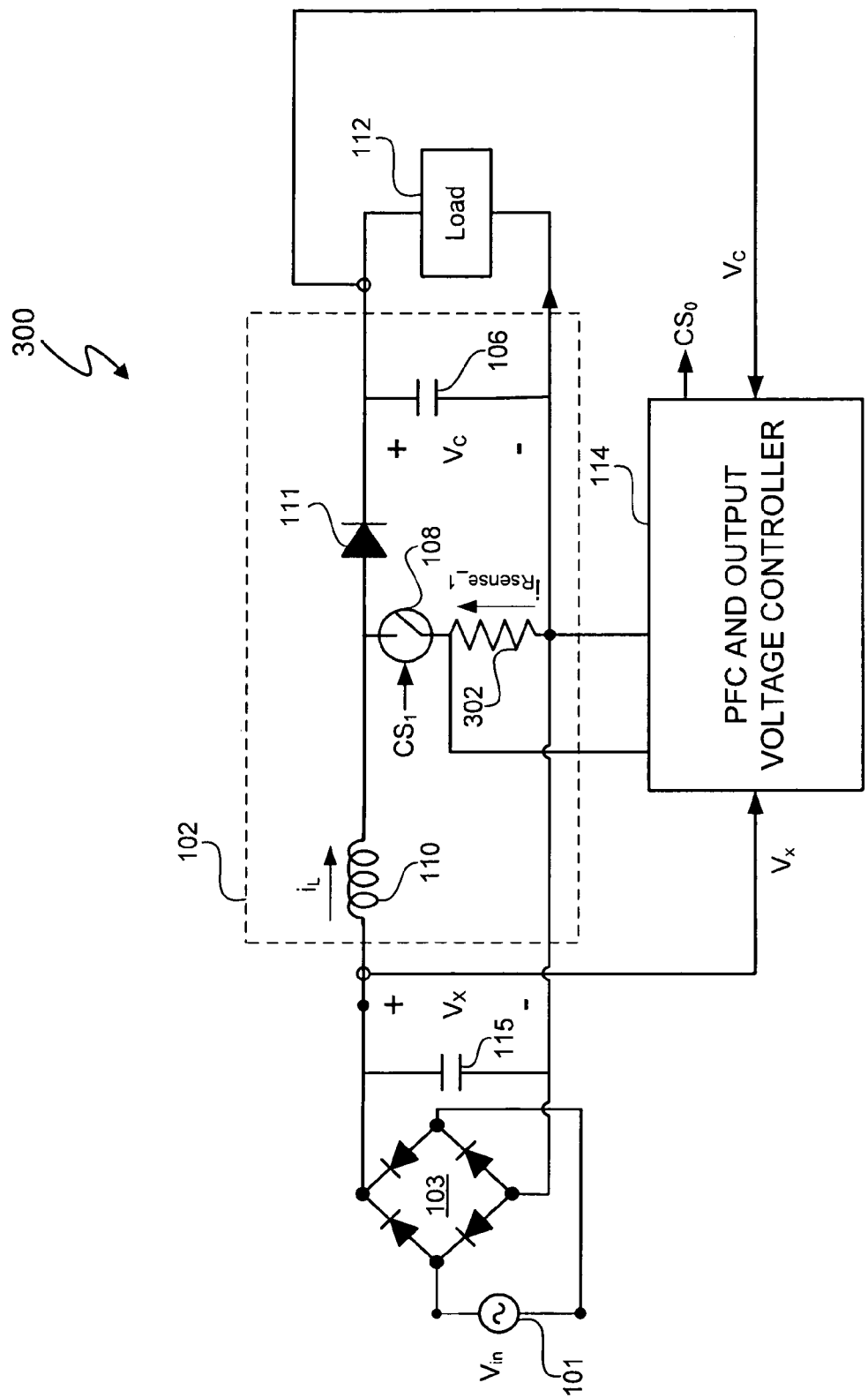
FIG. 3 (labeled prior art) depicts a power control system with a current sense resistor in series with a control switch of a switching power converter.
Figure 4:
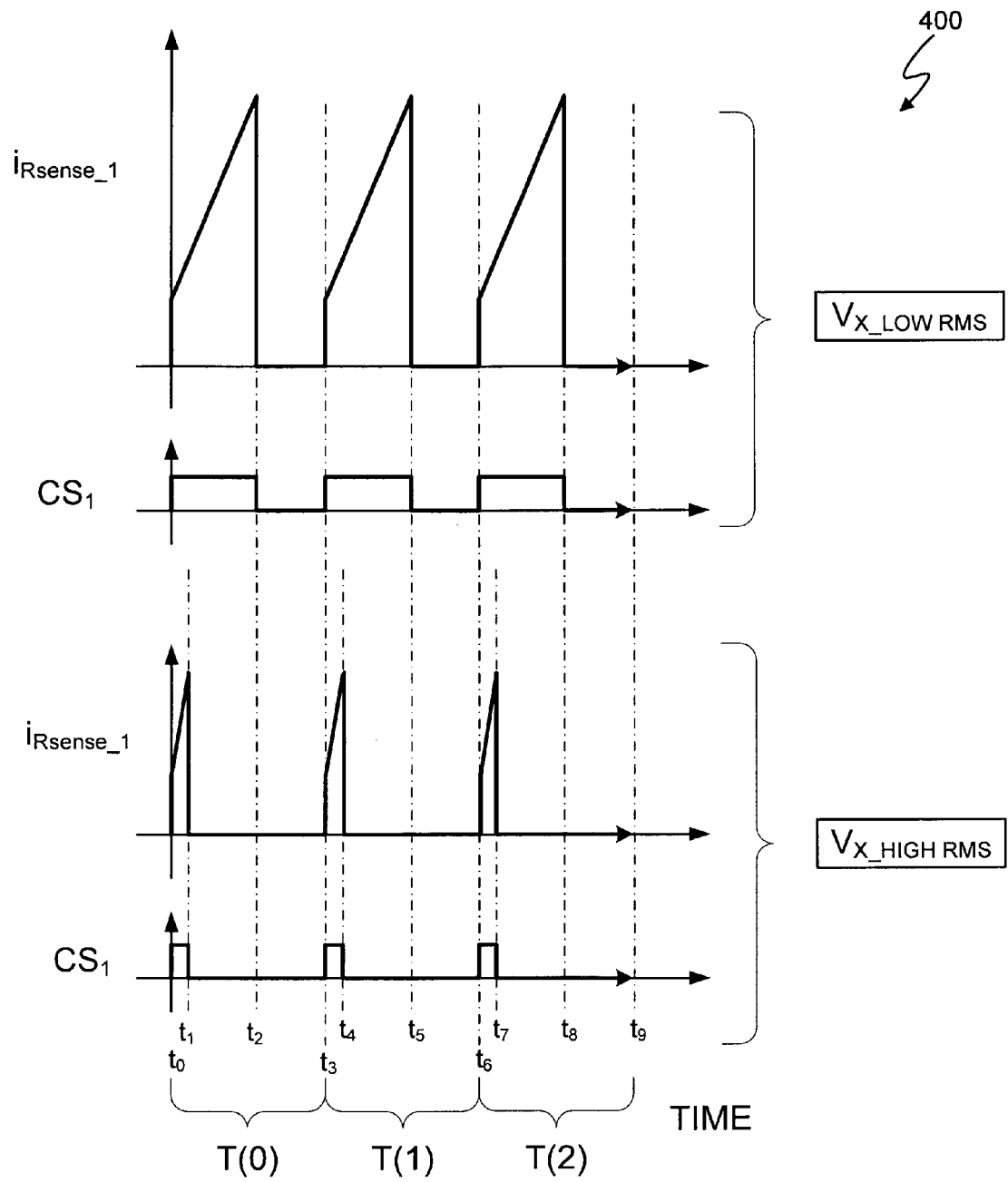
FIG. 4 (labeled prior art) depicts signal graphs of sense currents and switch control signals for the power control system of FIG. 3 during a low RMS input voltage and during a high RMS input voltage.
Figure 5:
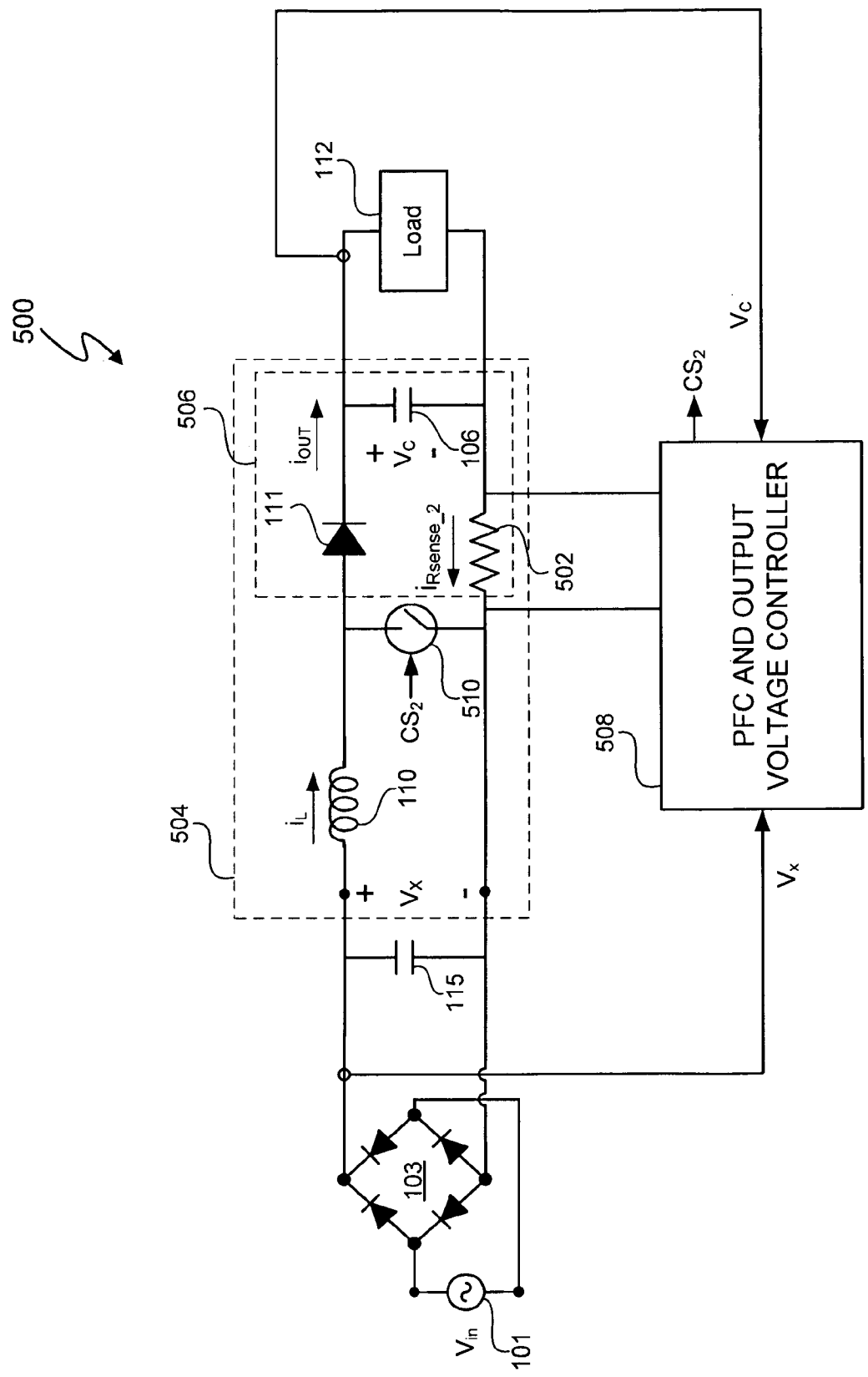
FIG. 5 depicts a power control system with a current sense resistor located in on an output side of a switching power converter.

FIG. 5 depicts power control system 500, which includes a current sense resistor 502 in the output side of switching power converter 504. In at least one embodiment, the output side of switching power converter 504 contains the components within box 506. A sense current $i_{Rsense\_2}$ flows through sense resistor 502, and PFC and output voltage controller 508 senses a voltage representing sense current $i_{Rsense\_2}$. The sense current $i_{Rsense\_2}$ tracks an output current $i_{out}$ of switching power converter 504. In at least one embodiment, sense resistor 502 is sized to produce a measurable signal for both a high RMS input voltage $V_{X\_HIGH\,RMS}$ and a low voltage input voltage $V_{X\_LOW\,RMS}$. In at least one embodiment, the measurable signal is 300 mV for an output power range of 100 Watts (W) to 400 W for switching power converter 504 with an input voltage $V_X$ of 110 Vac. Switching power converter 500 is depicted as a boost converter but could also be any boost type converter such as a fly-back converter.

PFC and output voltage controller 508 generates control signal $CS_2$ control conductivity of switch 510. In at least one embodiment, switch 510 is an n-channel FET, so a logical 'high' control signal $CS_2$ causes switch 510 to conduct, and a logical 'low' control signal $CS_2$ causes switch 510 to be nonconductive. Switch 510 can be any type of switch. For purposes of the following description, it will be assumed that switch 510 is an n-channel FET unless otherwise indicated.

Figure 6:
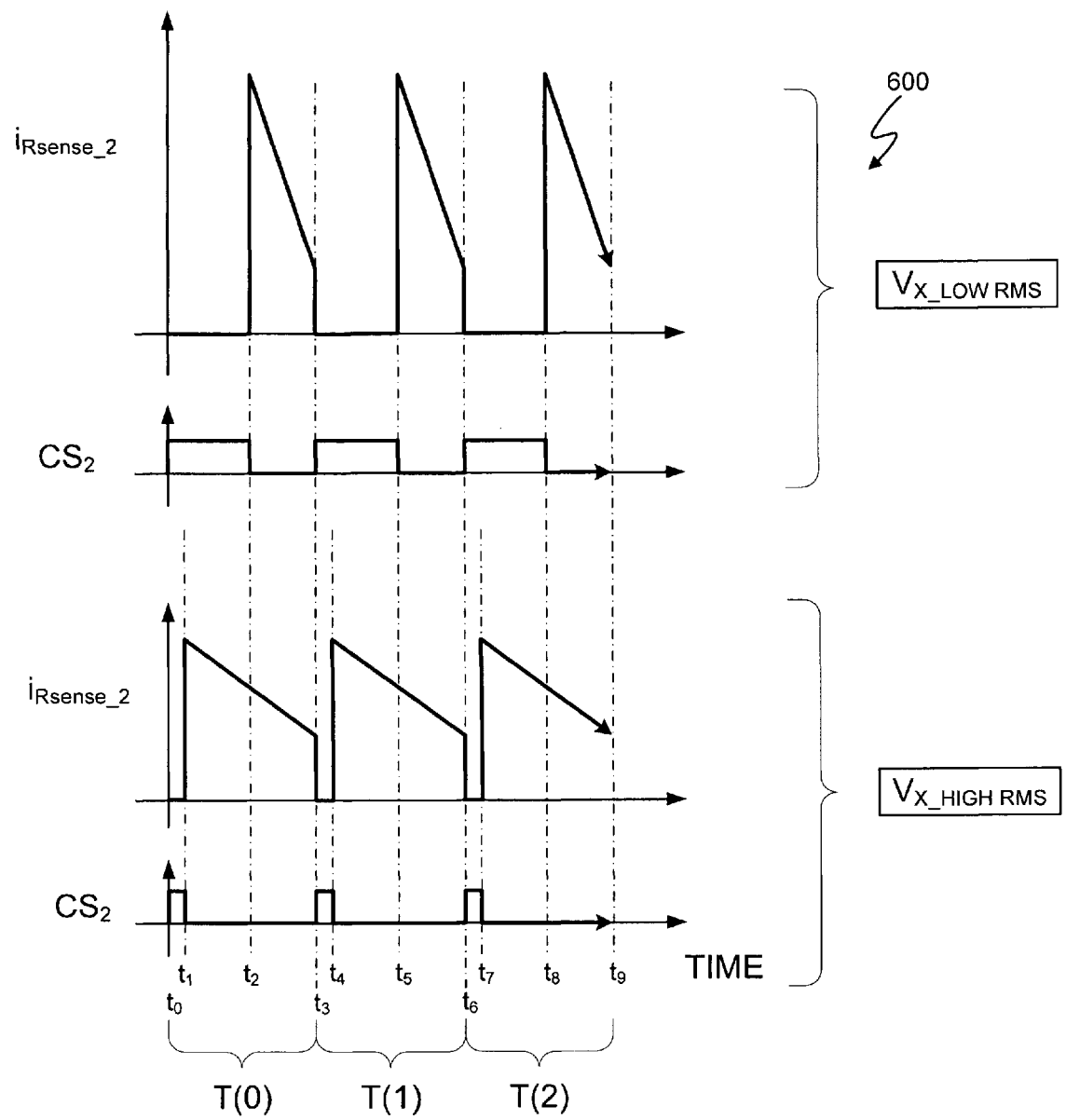
FIG. 6 depicts signal graphs of sense currents and switch control signals for the power control system of FIG. 5 during a low RMS input voltage and during a high RMS input voltage.

FIG. 6 depicts signal graphs 600, which depict sense current $i_{Rsense\_2}$ and corresponding control signal $CS_2$ for three periods T(0), T(1), and T(2) of control signal $CS_2$. Referring to FIGS. 5 and 6, in at least one embodiment, when control signal $CS_2$ is high, switch 510 conducts, and boost diode 111 prevents the inductor current $i_L$ from flowing into the output side 506 of switching power converter 504. Consequently, the sense current $i_{Rsense\_2}$ is zero when control signal is high, which is the opposite of sense currents $i_{Rsense\_0}$ and $i_{Rsense\_1}$. When control signal $CS_2$ is low, switch 510 is nonconductive, and current $i_{Rsense\_2}$ flows through current sense resistor 502.

As the input voltage $V_X$ decreases, the duty cycle of control signal $CS_2$ increases in order to provide enough current to meet the power demand of load 112. As the duty cycle of control signal $CS_2$ increases, the peak value of sense current $i_{Rsense\_2}$ increases. However, the duration of sense current $i_{Rsense\_2}$ decreases so that, in at least one embodiment, the RMS value of sense current $i_{Rsense\_2}$ remains approximately constant for a full range of input voltages $V_X$, such as a range of 90 V to 260 V. From another perspective, as the duty cycle of control signal $CS_2$ increases, the peak value of sense current $i_{Rsense\_2}$ decreases. However, the duration of sense current $i_{Rsense\_2}$ increases so that, in at least one embodiment, the RMS value of sense current $i_{Rsense\_2}$ remains approximately constant for the full range of input voltages $V_X$.

Figure 7:
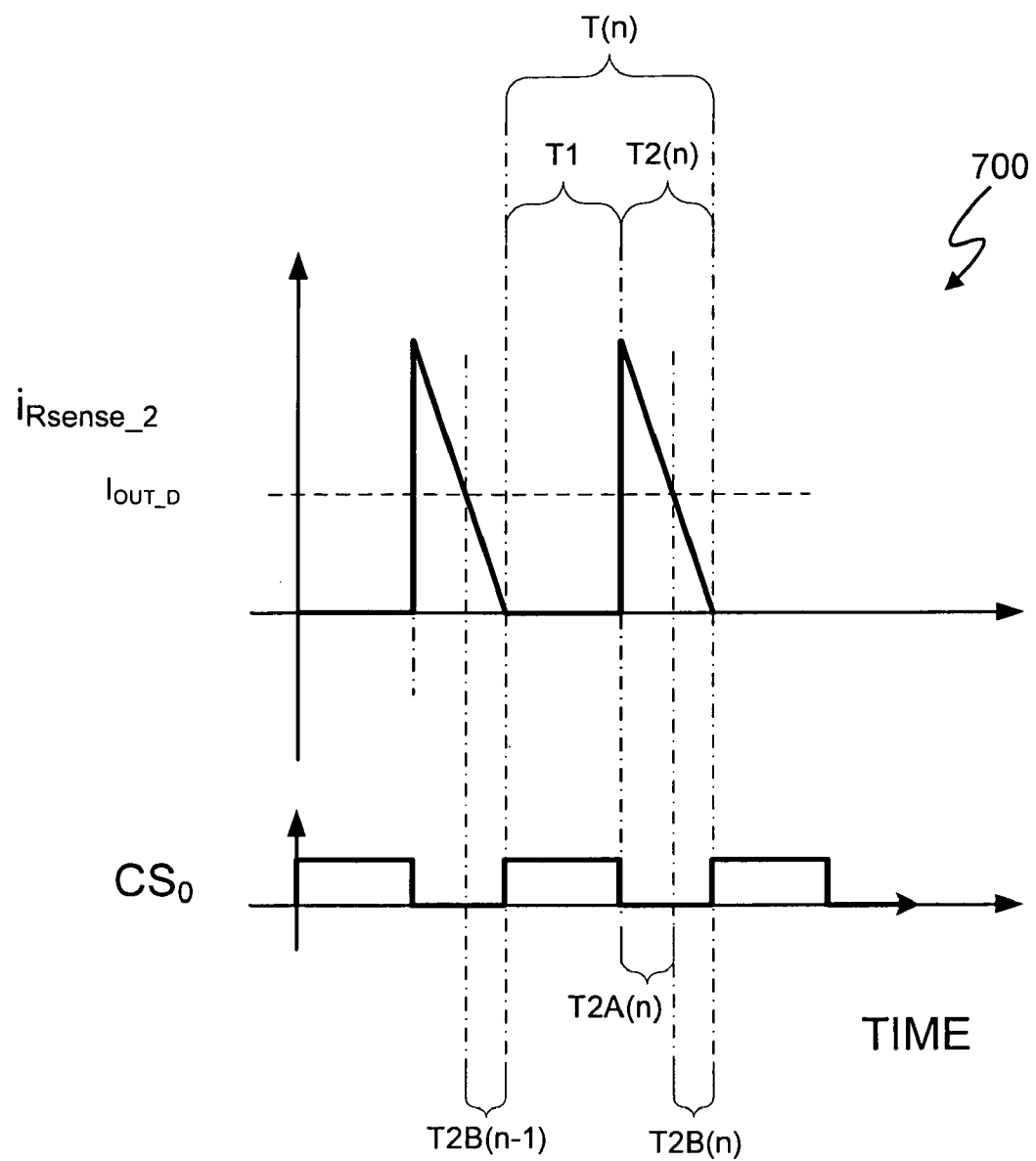
FIG. 7 depicts sense current and control signal graphs that illustrate values that can be used in one embodiment of a power factor correction and output voltage controller to determine the duty cycle of a control signal.

FIG. 7 depicts sense current and control signal graphs 700 that illustrate values that can be used in one embodiment of PFC and output voltage controller 508 to determine the duty cycle of control signal $CS_2$. Referring to FIGS. 5 and 7, PFC and output voltage controller 508 can determine control signal $CS_2$ in any number of ways so as to provide power factor correction, a desired output voltage $V_C$, and a desired output current $i_{out}$. In at least one embodiment, PFC and output voltage controller 508 generates control signal $CS_2$ to maintain a constant ON time for switch 510 and varies the duty cycle of control signal $CS_2$ to control power factor correction and obtain a desired output voltage $V_C$, and a desired output current $i_{out}$.

The ON time of switch 510 directly corresponds to the high time of control signal $CS_2$, and the OFF time of switch 510 directly corresponds to the low time of control signal $CS_2$. For a constant ON time T1 of switch 510, PFC and output voltage controller 508 monitors the value of sense current $i_{Rsense\_2}$ and determines the amount of OFF time T2(n) for the $n^{th}$ period of control signal $CS_2$. "n" is an index marker, such as an integer. In at least one embodiment, PFC and output voltage controller 508 determines an elapsed amount of time T2A(n) from the beginning of the low value of control signal $CS_2$ until the sense current $i_{Rsense\_1}$ equals a value corresponding to a desired value of output current $i_{OUT}$. The time T2A(n) can be determined using, for example, a digital counter (not shown) that compares a measured value of sense current $i_{Rsense\_1}$ with a desired value $i_{OUT\_D}$ of output current $i_{OUT}$. In at least one embodiment, the desired value $i_{OUT\_D}$ of output current $i_{OUT}$ depends on the output voltage $V_C$ and the power demand P of load 112 in accordance with: $P= V_C \cdot i_{OUT\_D}$. In at least one embodiment, to provide power factor correction for switching power converter 504, the desired value $i_{OUT\_D}$ tracks the input voltage $V_X$. With the desired value $i_{OUT\_D}$ of output current $i_{OUT}$ tracking the input voltage $V_X$, the output current $i_{OUT}$ will also track the input voltage $V_X$, thus, providing power factor correction for switching power converter 504.

The PFC and output voltage controller 508 can be implemented in any of a variety of ways including implemented as an integrated circuit or a combination of discrete components and an integrated circuit. The PFC and output voltage controller 508 can generate the control signal $CS_2$ with characteristics other than a constant ON time. For example, in at least one embodiment, the control signal $CS_2$ has a constant period, and the pulse width of control signal $CS_2$ is varied to provide power factor correction and regulate the output voltage $V_C$. In at least one embodiment, PFC and output voltage controller 508 can operate switching power converter 504 in discontinuous conduction mode or continuous conduction mode.

The OFF time T2(n) of switch 510, i.e. the low time of control signal $CS_2$, equals T2A(n)+T2B(n), i.e. T2(n)=T2A (n)+T2B(n). T2B(n) represents the second portion of the OFF time T2(n) representing the time from when the sense current $i_{Rsense\_2}$ reaches the desired output value $i_{OUT\_D}$ until the next period of control signal $CS_2$. In at least one embodiment, T2B(n) is determined from the average of T2A(n) and the second portion of the OFF time T2B(n−1) from the preceding period of control signal $CS_2$, i.e. T2B(n)=[(T2A(n)+T2B(n−1)]/2. Thus, in at least one embodiment for period T(n), PFC and output voltage controller 508 generates the control signal $CS_2$ with a constant high time of T1 and a low time of T2(n).

Figure 8:
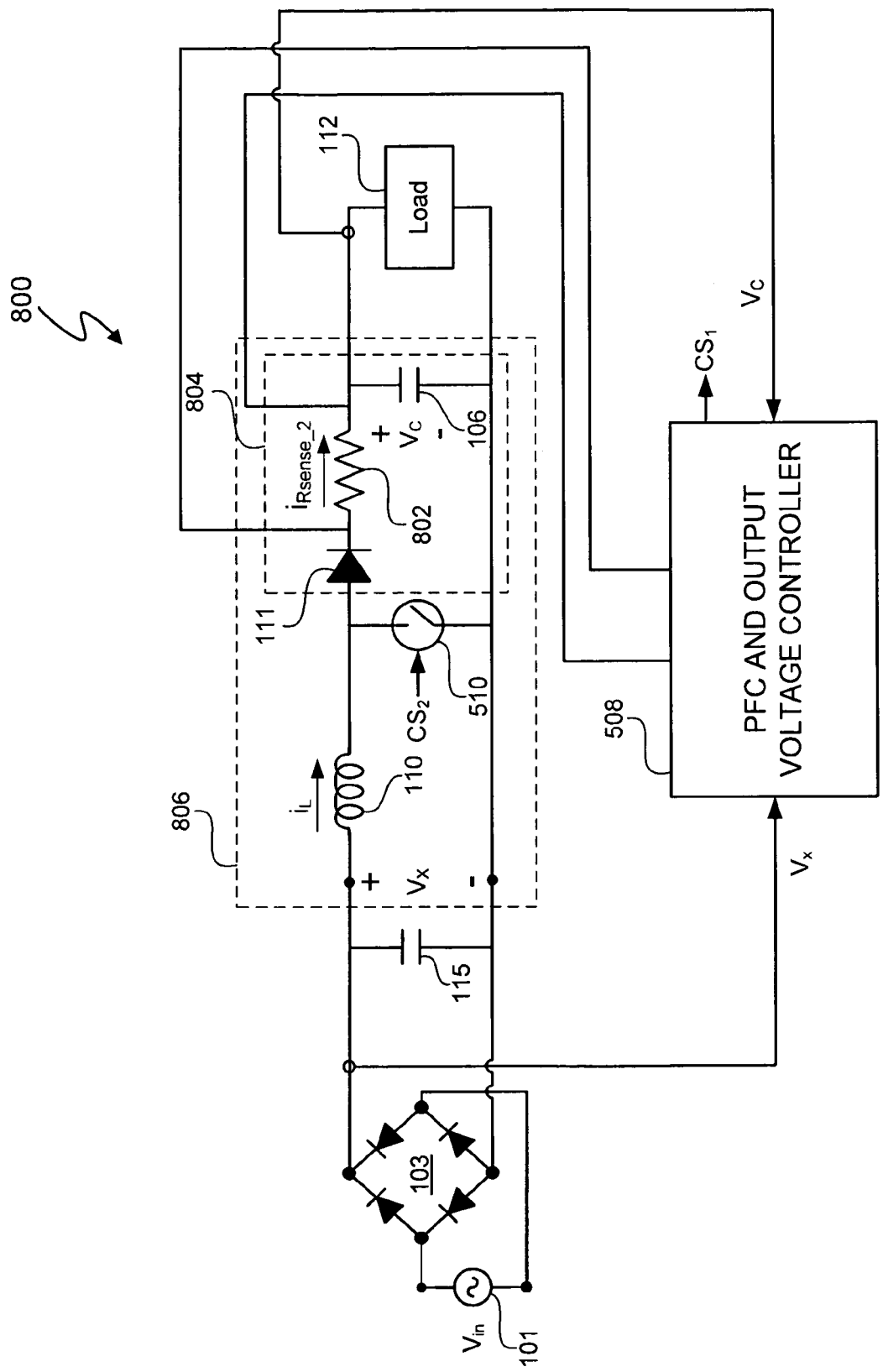
FIG. 8 depicts a power control system with a current sense resistor located in direct series with a boost diode on an output side of a switching power converter.

For example, FIG. 8 depicts power control system 800, which includes a current sense resistor 802 in the output side 804 of switching power converter 806. The current sense resistor 802 is directly in series with boost diode 111. PFC and output voltage controller 508 determines control signal $CS_2$ as described in conjunction with power control system 500. A current sensor can be connected in any number of other ways in the output side of a switching power converter.

Thus, a power control system includes a current sense resistor located on an output side of a switching power converter. By locating the current sense resistor on the output side of the switching power converter, the current sense resistor conducts a sense current when a control switch of the switching power converter is nonconductive and provides consistent power dissipation across a wide range of input voltages.

Although the present invention has been described in detail, it should be understood that various changes, substitutions and alterations can be made hereto without departing from the spirit and scope of the invention as defined by the appended claims.

What is claimed is:

1. An apparatus comprising:
  a switching power converter to boost a rectified, alternating current (AC) input voltage to the switching power converter to a higher output voltage during operation of the switching power converter, the switching power converter comprising:
    an inductor;
    a switch, coupled to the inductor, to control current to an output node of the switching power converter and to respond to a control signal to provide power factor correction so that an input, inductor current of the switching power converter tracks the AC input voltage; and
    a current sense resistor coupled to the output node of the switching power converter, wherein during operation of the switching power converter current flows through the current sense resistor only when the switch is nonconductive.

2. The apparatus of claim 1 wherein during operation of the switching power converter (1) the switching power converter is coupled to a voltage source that provides an input voltage and (2) an average value of the current in the current sense resistor is linearly related to output power of the switching power converter for a range of root mean square input voltage values.

3. The apparatus of claim 1 wherein during operation of the switching power converter (1) the switching power converter is coupled to a voltage source that provides an input voltage and (2) for a constant output power of the switching power converter current in the current sense resistor is approximately constant.

4. The apparatus of claim 1 further comprising a controller to operate the switching power converter in continuous conduction mode.

5. The apparatus of claim 1 wherein the switching power converter is selected from a group consisting of a boost converter and a fly-back converter.

6. The apparatus of claim 1 further comprising:
  an inductor coupled to an input node of the switching power converter and coupled to a node of the switch; and
  a diode coupled between the node of the switch and the output node of the switching power converter, wherein the current sense resistor is coupled between the node of the switch and the output node of the switching power converter.

7. The apparatus of claim 1 wherein the switch includes a first node coupled to the output node of the switching power converter and the output node of the switching power converter is a first output node, wherein the apparatus further comprises:
  an inductor coupled to the first node of the switch, wherein the switch includes a second node coupled to a second output node of the switching power converter and the current sense resistor is coupled between the second node of the switch and the second output node of the switching power converter.

8. The apparatus of claim 1 further comprising a load coupled to the switching power converter.

9. The apparatus of claim 8 wherein the load comprises one or more light emitting diodes.

10. An apparatus comprising:
a switching power converter, the switching power converter comprising:
  a first input node of the switching power converter;
  a second input node of the switching power converter;
  a first output node of the switching power converter;
  a second output node of the switching power converter;
  an inductor coupled between the first input node and the second output node of the switching power converter;
  a switch having a first node coupled to the inductor and a second node coupled to the second output node of the switching power converter;
  a diode having a first node coupled to the first node of the switch and a second node coupled to the first output node of the switching power converter;
  a capacitor having a first node coupled to the second node of the diode and a second node coupled to the second node of the switch; and
  a current sense resistor connected between the second node of the capacitor and the second node of the switch, wherein during operation of the switching power converter current flows through the current sense resistor only when the switch is nonconductive.

11. The apparatus of claim 10 wherein the switching power converter is selected from a group consisting of a boost converter and a fly-back converter.

12. The apparatus of claim 10 further comprising a controller to operate the switching power converter in continuous conduction mode.

13. The apparatus of claim 10 wherein during operation of the switching power converter (1) the switching power converter is coupled to a voltage source that provides an input voltage and (2) an average value of the current in the current sense resistor is linearly related to output power of the switching power converter for a range of root mean square input voltage values.

14. The apparatus of claim 13 wherein during operation of the switching power converter (1) the switching power converter is coupled to a voltage source that provides an input voltage and (2) for a constant output power of the switching power converter current in the current sense is approximately constant.

15. A method comprising:
boosting a rectified, alternating current (AC) input voltage to a switching power converter to a higher output voltage of the switching power converter;
operating a switch to control current to an output terminal of a switching power converter and to provide power factor correction so that an input, inductor current of the switching power converter tracks the AC input voltage; and
generating a signal representing the current to the output terminal of the switching power converter using a current sense resistor, wherein during operation of the switching power converter current flows through the current sense resistor only when the switch is nonconductive.

16. The method of claim 15 further comprising:
receiving an input voltage to the switching power converter, wherein an average value of the current in the current sense resistor is linearly related to output power of the switching power converter for a range of root mean square values of the input voltage.

17. The method of claim 15 further comprising:
receiving an input voltage to the switching power converter, wherein for a constant output power of the switching power converter current in the current sense resistor is approximately constant.

18. The method of claim 15 further comprising operating the switching power converter in continuous conduction mode.

19. The method of claim 15 wherein the switching power converter is selected from a group consisting of a boost converter and a fly-back converter.

20. An apparatus comprising:
means to boost a rectified, alternating current (AC) input voltage to a switching power converter to a higher output voltage of the switching power converter;
means to operate a switch to control current to an output terminal of a switching power converter and to provide power factor correction so that an input, inductor current of the switching power converter tracks the AC input voltage; and
means to sense the current to the output terminal of the switching power converter using a current sense resistor, wherein during operation of the switching power converter current flows through the current sense resistor only when the switch is nonconductive.

21. An integrated circuit to control a switching power converter, the integrated circuit comprising:
a power factor correction controller having at least one input to receive a sense signal representative of a current of the switching power converter, wherein the switching power converter includes a switch and:
  (i) the sense signal represents current in the switching power converter only when the switch is nonconductive; and
  (ii) the power factor correction controller is configured to generate a control signal to control conductivity of the switch and control conductivity of the switch controls power factor correction of the switching power converter so that an input, inductor current of the switching power converter tracks the AC input voltage.

22. The integrated circuit of claim 21 wherein during operation of the switching power converter (1) the switching power converter is coupled to a voltage source that provides an input voltage and (2) an average value of the current in the current sense resistor is linearly related to output power of the switching power converter for a range of root mean square input voltage values.

23. The integrated circuit of claim 21 wherein during operation of the switching power converter (1) the switching power converter is coupled to a voltage source that provides an input voltage and (2) for a constant output power of the switching power converter current in the current sense resistor is approximately constant.

24. The integrated circuit of claim 21 wherein the power factor correction controller is configured to operate the switching power converter in continuous conduction mode.

25. The integrated circuit of claim 21 wherein the power factor correction controller is further configured to:

generate a high value of the control signal, wherein the switch conducts during the high value of the control signal; and determine an amount of time T2 for a low value of the control signal, wherein the switch is nonconductive during the low value of the control signal, wherein determining the amount of time T2 is determined from:

$T2B(n)=[(T2A(n)+T2B(n-1)]/2,$ wherein T2A(n) represents a first portion of the amount of time T2 and T2B(n−1) represents a remaining portion of the amount of time T2 from an immediately preceding cycle of the control signal.

26. A method of controlling a switching power converter, the integrated circuit comprising:
receiving a sense signal representative of a current of the switching power converter, wherein the switching power converter includes a switch and the sense signal represents current in the switching power converter only when the switch is nonconductive; and
generating a control signal to control conductivity of the switch, wherein controlling conductivity of the switch controls power factor correction of the switching power converter so that an input, inductor current of the switching power converter tracks a rectified, alternating current (AC) input voltage to the switching power converter.

27. The method of claim 26 wherein during operation of the switching power converter (1) the switching power converter is coupled to a voltage source that provides an input voltage and (2) an average value of the current in the current sense resistor is linearly related to output power of the switching power converter for a range of root mean square input voltage values.

28. The method of claim 26 wherein during operation of the switching power converter (1) the switching power converter is coupled to a voltage source that provides an input voltage and (2) for a constant output power of the switching power converter current in the current sense resistor is approximately constant.

29. The method of claim 26 further comprising:
operating the switching power converter in continuous conduction mode.

30. The method of claim 26 further comprising:
generating a high value of the control signal, wherein the switch conducts during the high value of the control signal; and
determining an amount of time T2 for a low value of the control signal, wherein the switch is nonconductive during the low value of the control signal, wherein determining the amount of time T2 is determined from:

$T2B(n)=[(T2A(n)+T2B(n-1)]/2,$ wherein T2A(n) represents a first portion of the amount of time T2 and T2B(n−1) represents a remaining portion of the amount of time T2 from an immediately preceding cycle of the control signal.

31. The method of claim 1 wherein the switching power converter further comprises:
a diode; and
a capacitor coupled to the diode and the switch;
wherein the current sense resistor is coupled between the switch and the capacitor.

32. The method of claim 1 wherein during operation the switching power converter current flowing through the current sense resistor represents the input, inductor current.

33. The apparatus of claim 10 wherein during operation of the switching power converter current flows through the current sense resistor only when the switch is nonconductive.

34. The method of claim 15 wherein boosting the rectified, alternating current (AC) input voltage to the switching power converter further comprises:
providing current from an inductor of the switching power converter through a diode to a capacitor at an output of the switching power converter when the switch is nonconductive, wherein the current sense resistor is coupled between the switch and the capacitor.

35. The method of claim 15 wherein during operation the switching power converter current flowing through the current sense resistor represents the input, inductor current.

36. The integrated circuit of claim 21 wherein to control conductivity of the switch further controls provision of current from an inductor of the switching power converter through a diode to a capacitor at an output of the switching power converter when the switch is nonconductive, wherein the current sense resistor is coupled between the switch and the capacitor.

37. The integrated circuit of claim 21 wherein during operation the switching power converter current flowing through the current sense resistor represents the input, inductor current.

38. The method of claim 26 wherein generating the control signal to control conductivity of the switch further comprises:
providing current from an inductor of the switching power converter through a diode to a capacitor at an output of the switching power converter when the switch is nonconductive, wherein the current sense resistor is coupled between the switch and the capacitor.

39. The method of claim 26 wherein during operation the switching power converter current flowing through the current sense resistor represents the input, inductor current.

* * * * *